United States Patent [19]
Girouard, Sr. et al.

[11] Patent Number: 5,528,807
[45] Date of Patent: * Jun. 25, 1996

[54] CROSS-TIE PRE-PLATING SYSTEM

[75] Inventors: Gerald D. Girouard, Sr., New Iberia; Gerald D. Girouard, Jr., Lafayette; Donald Darcey, New Iberia, all of La.

[73] Assignee: Coastal Timbers, Inc. (LA Corp), New Iberia, La.

[ * ] Notice: The portion of the term of this patent subsequent to Sep. 6, 2011, has been disclaimed.

[21] Appl. No.: 300,749

[22] Filed: Sep. 6, 1994

Related U.S. Application Data

[63] Continuation of Ser. No. 207,118, Feb. 28, 1994, Pat. No. 5,343,606, which is a continuation of Ser. No. 85,400, Jun. 30, 1993, abandoned.

[51] Int. Cl.$^6$ ..................................................... E01B 29/32
[52] U.S. Cl. ........................... 29/33 K; 29/798; 104/16
[58] Field of Search ..................................... 29/33 K, 464, 29/466, 468, 564.1, 787, 795, 798; 104/16, 17.1

[56] References Cited

U.S. PATENT DOCUMENTS 5,343,606   9/1994   Girouard, Sr. et al. ............... 29/33 K

*Primary Examiner*—Daniel W. Howell
*Attorney, Agent, or Firm*—Joseph T. Regard, Ltd.

[57] ABSTRACT

A machine for fastening rail plates to cross-ties, utilizing spikes or the like, and method therefore, is disclosed in the present invention. The preferred apparatus of the present invention teaches a system wherein there is provided a conveyor for conveying a plurality of laterally arranged, juxtaposed ties in bulk, a loader or retriever for loading a single tie upon a template conveyer, and a positioner for positioning the single tie during the pre-plating process. The present invention further includes a template system for securing the cross-tie or tie in place, feeding and positioning the rail-plate in place, feeding, dispensing, and positioning the spikes in place, driving the spikes, and discharging the processed tie, the template system utilizing as a principle motive force the displacement of the template reciprocating drive piston for positioning the template, as well as dispensing and positioning the spikes and plates.

6 Claims, 16 Drawing Sheets

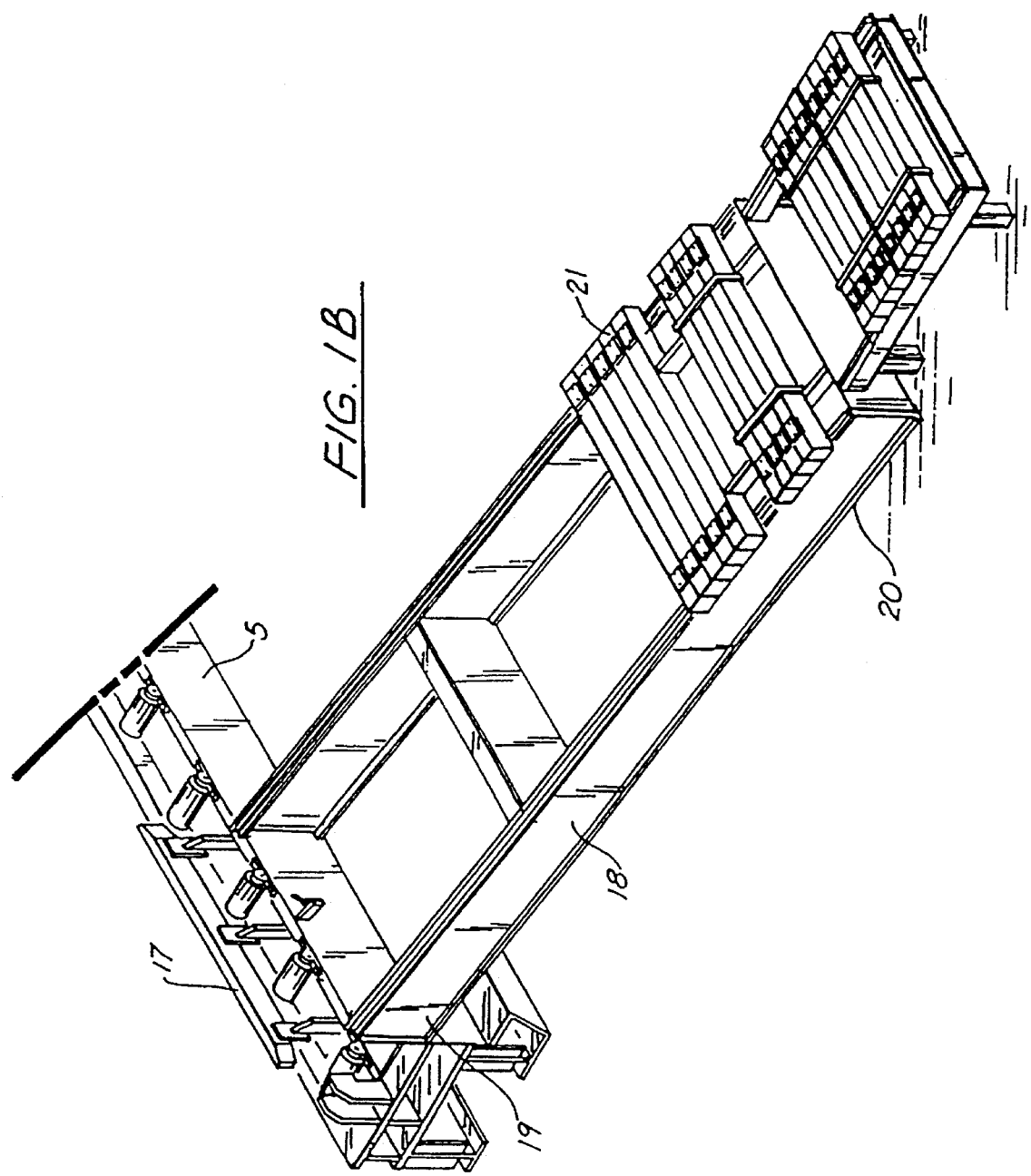

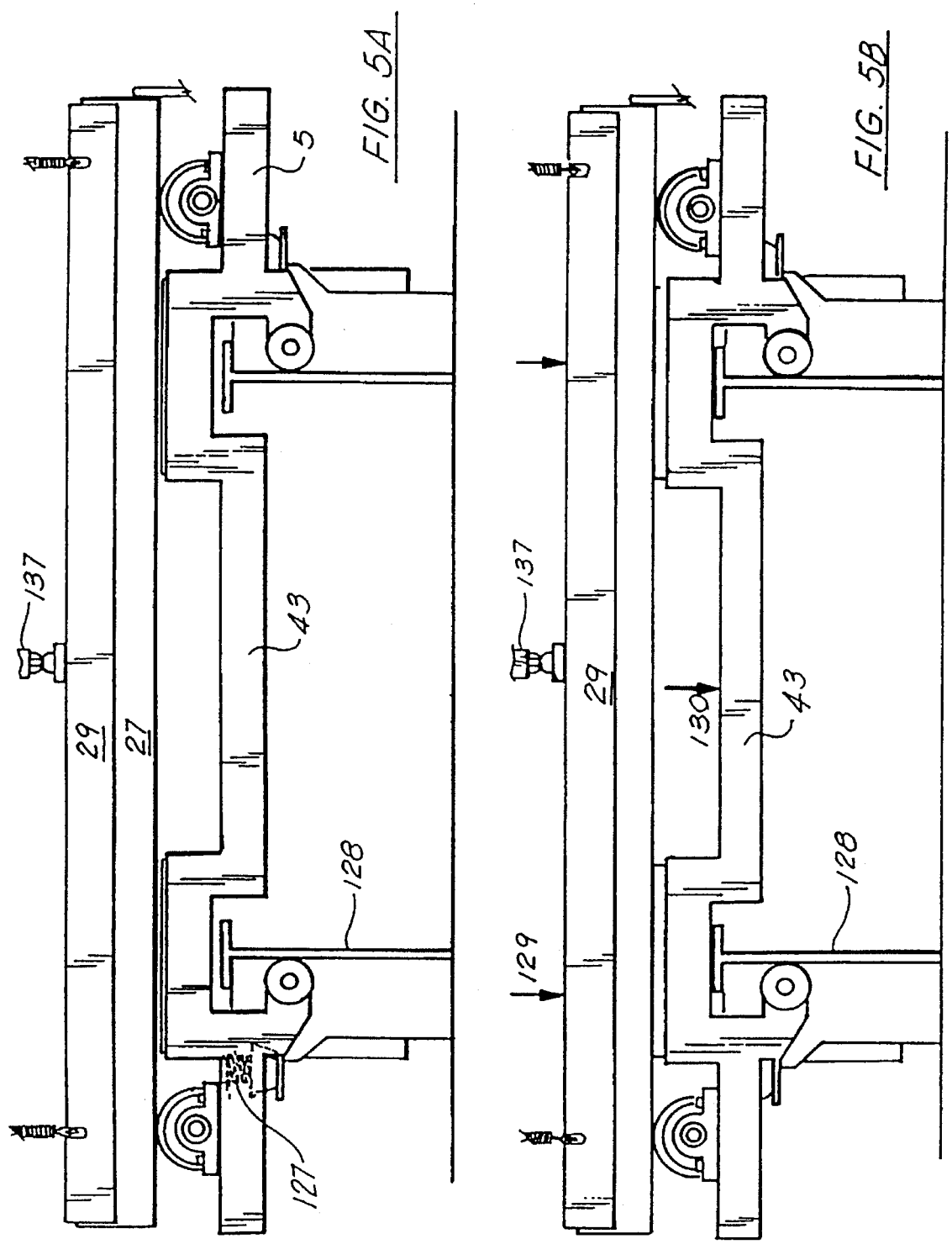

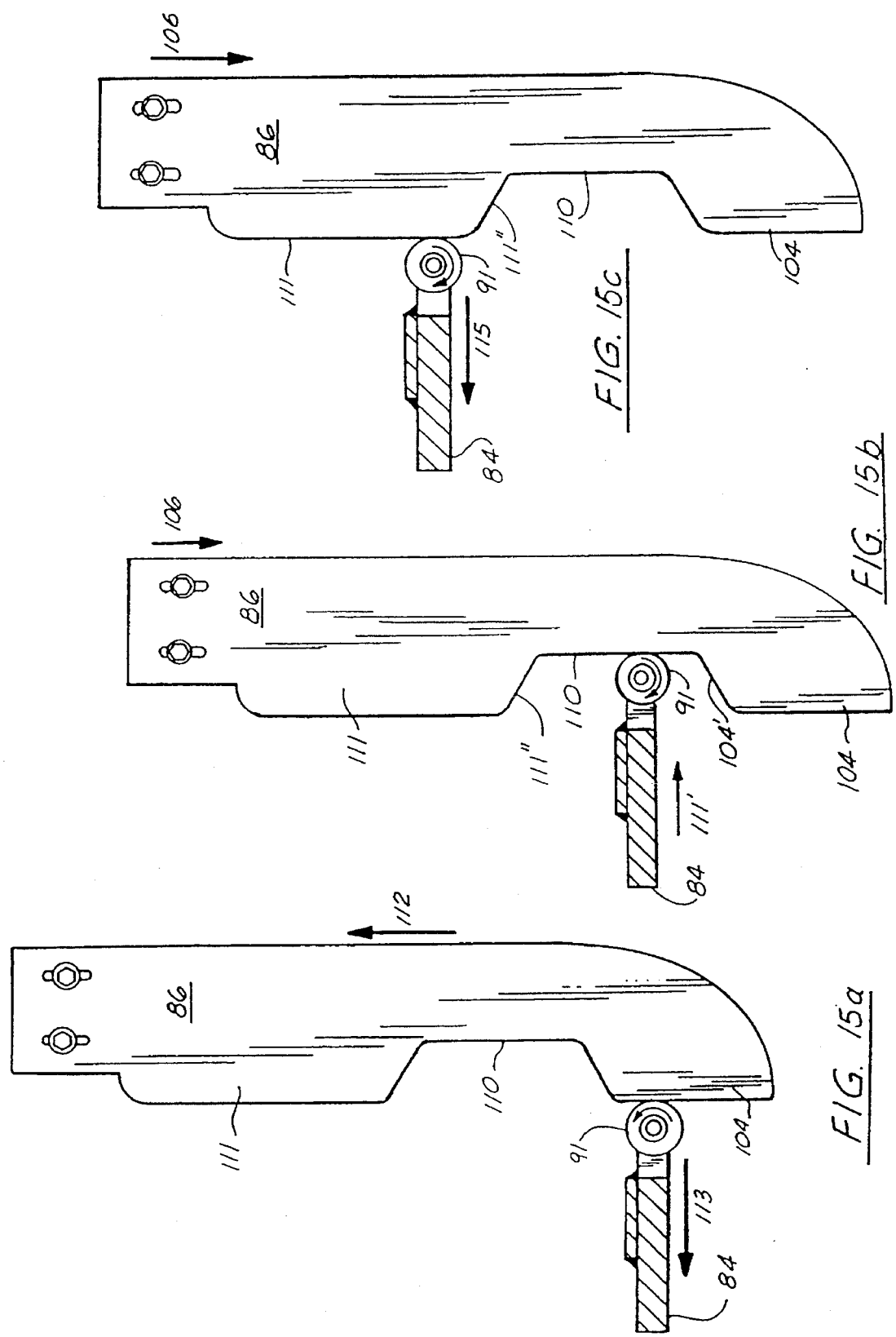

CROSS-TIE PRE-PLATING SYSTEM

STATEMENT OF CONTINUING APPLICATIONS

This application is a continuation of U.S. patent application Ser. No. 08/207,118, issuing as U.S. Pat. No. 5,343,606 on Sep. 6, 1994, having a filing date of Feb. 28, 1994, entitled Cross-Tie Pre-Plating System, which itself is a file wrapper continuation of U.S. patent application Ser. No. 08/085,400, filed Jun. 30, 1993, indicating as inventors Gerald David Girouard Sr, Gerald David Girouard, Jr. and Donald Darcey, said application entitled Cross-Tie Pre-Plating Apparatus (now abandoned).

BACKGROUND of the INVENTION

1. Invention Field

The present invention relates to Railroad construction apparatus, and in particular to a machine for fastening rail plates to cross-ties, utilizing spikes or the like, pre-plating the ties for use in constructing railroad track systems or the like. The preferred apparatus of the present invention teaches a system wherein there is provided a conveyor for conveying a plurality of laterally arranged, juxtaposed ties in bulk, a loader or retriever for loading a single tie upon a template conveyer, and a positioner for positioning the single tie in the pro-plating during the pre-plating process. The present invention further includes a template system for securing the loaded cross-tie in place, a gravity conveyor system for the rail plates, for feeding and positioning an individual rail plate in place on the tie, a spike feeding, dispensing, positioning, and driving system, arid a discharging mechanism for dispensing the processed tie. The present invention is unique in its relative simplicity when compared to prior art systems, taking into account the many functions performed, with many of the principle functional elements of the invention being accomplished utilizing as a motive force the displacement of the of the upper template member, from its raised position to its lowered position.

2. General Background Discussion

While the prior art has contemplated several systems, some going as far back as the late 1800's, for fastening rail plates or the like to railroad ties, most have proved to be so complicated as to be rather expensive to construct and maintain, or so simple as to be rather labor intensive and perhaps even dangerous to utilize. Perhaps this is why (even today) for pre-plating operations, manual installation of rail plates is still the preferred method, with laborers utilizing pneumatic hammers or sledge hammers for manually affixing rail plates to railroad ties, a slow, arduous, and undoubtedly dangerous task. A listing of prior patents which may have some general interest with regard to the present case are as follows:

| U.S. Pat. No. | Inventor(s) | Dates of Issue |
| --- | --- | --- |
| 567,232 | Greenshield, W.H. | 09/08/1896 |
| 578,869 | Haley, P. | 03/16/1897 |
| 594,731 | Dowe, G.W. | 11/30/1897 |
| 680,542 | Peter, J.S. | 08/13/1901 |
| 703,755 | Bender, G.L. | 07/01/1902 |
| 712,167 | Wood, F.W. | 10/28/1902 |
| 2,762,313 | Subleft, I. | 09/11/1956 |
| 3,405,649 | Foxx et al | 10/15/1968 |
| 3,701,320 | Fearon et al | 10/31/1972 |
| 3,717,101 | Katcha et al | 02/10/1973 |
| 3,753,404 | Bryan, J.F. | 08/21/1973 |
| 4,178,671 | Lutting, D. | 12/18/1979 |
| 4,280,613 | Stewart | 07/28/1981 |
| 4,393,784 | Theurer | 07/19/1983 |
| 4,928,600 | Urmson, Jr. et al | 05/29/1990 |
| 5,067,412 | Theurer et al | 11/26/1991 |

U.S. Pat. Nos. 3,701,320 (col 1) and 4,178,671 (col 1,2) teach or suggest the utilization of rollers for conveying laterally situated cross-ties for assembly and discharge.

U.S. Pat. No. 3,753,404 teaches (FIG. 6) a type of gravity feed for spikes, although the configuration and operation is fully distinguishable from the present, searched for invention.

U.S. Pat. No. 4,280,613 issued Jul. 28, 1981, teaches a "Tie Plate Conveying and Orienting System" wherein there is taught a system for dispensing tie plates. Unlike the present invention, however, '613 does not teach or contemplate individual dispenser control and movement dependent upon the upstroke and downstroke of the spike fastening means.

U.S. Pat. No. 3,405,649 issued Oct. 15, 1968 teaches a "Spike Driver", contemplating the utilization of gravity trays for the dispensing of spikes, in conjunction with jaws for grabbing each individual spike and placing same over the area to be driven. However, '649 does teaches a jaw configuration and manipulation means more complicated and distinguishable from the present invention, both in terms of operation and implementation.

U.S. Pat. No. 703,755 issued 1902 contemplates a "Tie-Plating Machine" wherein there is taught the utilization of "gage-plates" or the like for holding the tie-plates in proper position, while being forced into the tie (the tie plates in this system utilize a distinguishable fastener built-in, as understood), the system being again distinguishable from that contemplated in the present, searched for invention.

As one may discern from a review of the above patents, the prior art has yet to contemplate an efficient, cost effective, yet safe and relatively uncomplicated system for pre-plating railroad ties or the like. Perhaps this is why manual installation is still considered, by far, the most cost effective means of accomplishing this task. However, with increasing labor and health insurance costs, as well as the inherent limitations of speed and supervision involved with a work crew, automated alternatives would be preferable, provided satisfactory alternatives existed.

SUMMARY DISCUSSION OF THE INVENTION

Unlike the prior art, the present invention provides railroad-tie pre-plating system which is comparatively low maintenance and reliable, while being relatively inexpensive to manufacture, requiring little in the way of continued adjustment, while being consistent in cycle time and output quality.

The preferred embodiment of the present invention teaches a system wherein there is included:

Gravity feed means for feeding the cross ties in bulk via decline rollers;

Retrieval means for retrieving an individual cross-tie from the gravity feed;

Positioning means for positioning a single tie under a template;

Template securing means for securing the template about the positioned tie;

Rail-plate feeding and positioning means for positioning first and second rail plates on their designated areas on the cross tie;

Spike feeding and dispensing means for dispensing individual spikes;

Magnetically actuated spike positioning means for positioning each spike in the desired areas in conjunction with the rail plates;

Hydraulic fastening means for fastening the rail plates to the cross tie via spikes;

Discharge means for removing the pre-plated cross tie for stacking.

Unlike the prior art, the present invention contemplates a system wherein all of the various elements interrelate in function and operation, providing a more efficient, less redundant apparatus. As such, the present invention as currently configured in a working embodiment is capable of pre-plating over eighty (80) cross ties per hour cycle time, with an average cycle time of about sixty (60) per hour.

It is therefore an object of the present invention to provide a railroad cross-tie pre-plating system cross-ties in an hour, with an average cycle rate of being just under one minute per tie. This is compared to a manual crew of five workers, which typically must take breaks on the hour (more on hot days), and whose hourly rate in optimal conditions will not exceed thirty (30) pre-plated railroad cross-ties per hour.

Besides the unique method of operation, utilizing the present invention apparatus in the pre-plating context, the present invention also contemplates a novel system mechanism, wherein many of the principle functional elements of the invention being accomplished utilizing as a motive force the displacement of the reciprocating template piston from its raised position to its lowered position. This vertical motion is configured to provide the motive operating force for dispensing both the spikes as well as (indirectly) the rail plates from their bulk gravity feed, individually to their appropriate position on the railroad tie for processing. A second motive force utilized comprises the four pistons and their respective shaft press pieces for driving their respective four spikes, two for each rail plate; in addition to driving the spikes, each of these pistons operate also in conjunction with the vertical motive force provided by their respective pistons, their respective spike positioning means in the form of a template/spike manipulation arm, translating that vertical motion into back and forth horizontal motion, grabbing, handling, and positioning each rail spike in the appropriate position for fastening the rail plates to the cross-tie.

While the system is relatively portable, and able to be transported to a production site in three, readily assembled pieces, an alternative embodiment of the present invention teaches a version of the invention which is designed especially for portability, wherein the main conveyor/pre-plating area of the apparatus is located on a railroad flat car or semi flatbed.

It is therefore an object of the present invention to provide a railroad cross-tie pre-plating system which is relatively simple in operation, yet efficient, reliable, and inexpensive to operate.

It is another object of the present invention to provide a railroad cross-tie pre-plating system which is able to be operated by one or two workers.

It is another object of the present invention to provide a railroad cross-tie pre-plating system wherein the many operative elements rely upon common motive force, reducing redundancy, likelihood of failure, and expense.

It is still another object of the present invention to provide a railroad cross-tie pre-plating system which provides a per unit cycle of one minute or less.

Finally, it is an object of the present invention to provide a railroad cross-tie pre-plating system which may be readily disassembled, transported to a site location, and re-assembled with minor adjustments and start-up procedure.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1B is an isometric view of the cross-tie pre-plating apparatus of FIG. 1A, illustrating the last portion of the horizontal conveyor, and the gravity dump conveyor of the present invention.

FIG. 5A is a side view of the cross-tie pre-plating apparatus of the present invention of FIG. 1A, illustrating the central conveyor piece of the horizontal conveyor.

FIG. 5B is a side view of the cross-tie pre-plating apparatus of the present invention of FIG. 5A, further illustrating the central conveyor piece of the horizontal conveyor.

FIG. 15A is a side view of the cross-tie pre-plating apparatus of the present invention of FIG. 1A, illustrating the spike arm manipulation template and its interaction with the spike manipulation arm at its highest, retracted point.

FIG. 15B is a side view of the cross-tie pre-plating apparatus of the present invention of FIG. 15A, illustrating the spike arm manipulation template and its interaction with the spike manipulation arm at its medial point.

FIG. 15C is a side view of the cross-tie pre-plating apparatus of the present invention of FIG. 15A, illustrating the spike arm manipulation template and its interaction with the spike manipulation arm at its lowest fully extended point.

DETAILED DESCRIPTION OF THE INVENTION

Figure 1A:
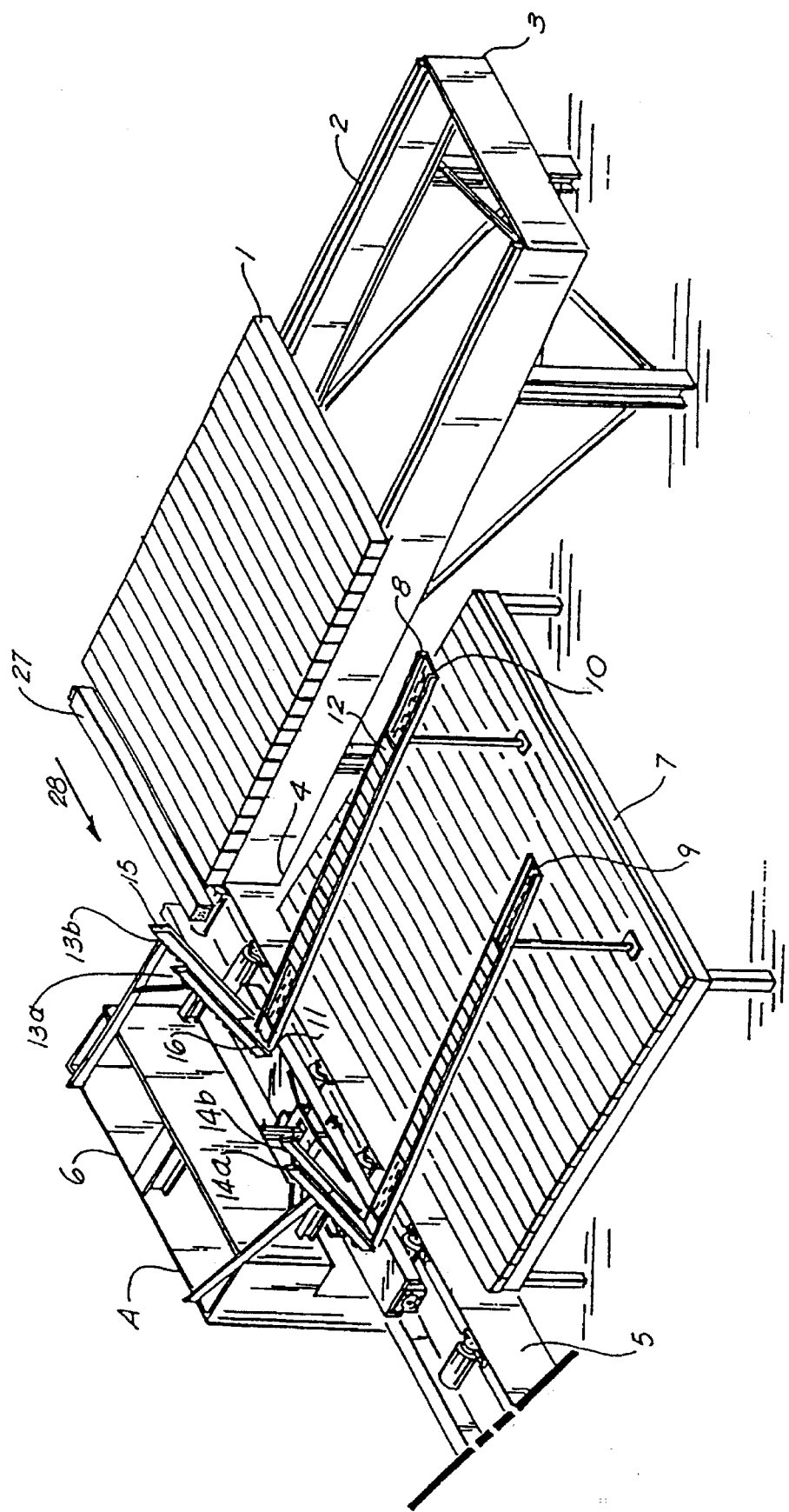
FIG. 1A is an isometric view of the cross-tie pre-plating apparatus of the present invention, illustrating the cross-tie gravity conveyor, horizontal conveyor, and pre-plating section of the apparatus of the present invention.

As can be seen in FIG. 1A, the railroad cross-tie pre-plating system A of the preferred, exemplary embodiment of the present invention, includes a gravity conveyor 2 having bulk, un-plated railroad ties 1 juxtaposed in lateral disposition thereon, the gravity conveyor having a first, higher end 3, and a second, lower end 4. As shown, the gravity conveyor 2 communicates with a horizontal conveyor 5, configured to accept one tie at a time, the horizontal conveyor configured to guide a loaded tie 27, directing 28 said tie into and out of the plating area 6.

As shown, juxtaposed the gravity feed 2 and horizontal conveyor 5 is an operation platform 7, wherein the operator monitors and operates the present system. Disposed longitudinally along the platform are first 8 and second 9 plate conveyors, for conveying (via gravity) railroad plates 12 to the pre-plating area, each plate conveyor 8,9 having a first, higher end 10 and a second, lower end 11.

Additionally, the present invention includes first 13a,b and second 14a,b pairs of spike gravity conveyors for conveying spikes into the plating area 6, each one of the spike gravity conveyors 13a,b, 14a,b having a first, upper end 15, and a second, lower end 16, the second lower end communicating with the plating area 6.

As illustrated in FIG. 1B, the apparatus of the present invention further includes a gravity dump conveyor 18, having a first, upper end 19, and a second, lower end 20, the gravity dump conveyor in communication with the end of the horizontal conveyor 5. As further shown, a kicker 17 mechanism is configured remove the processed tie from the horizontal conveyor 5, placing the processed railroad ties 21 upon the gravity dump conveyor 18.

Figures 2A, 2B:
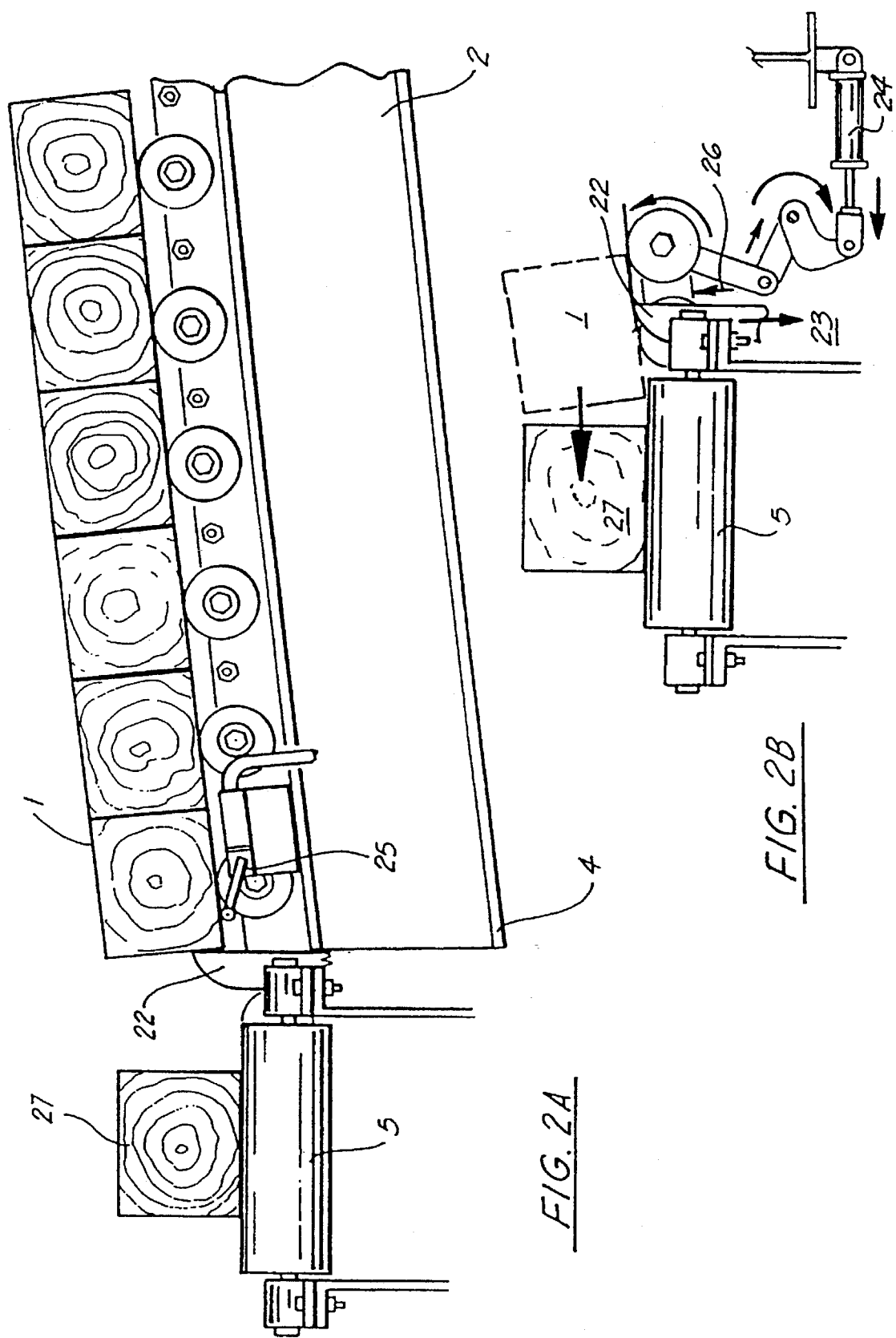
FIG. 2A is a side view of the cross-tie pre-plating apparatus of the present invention of FIG. 1A, illustrating the blocking member apparatus for dispensing individual ties from the gravity conveyor to the horizontal conveyor.
FIG. 2B is view of the cross-tie pre-plating apparatus of the present invention of FIG. 2A, illustrating the blocking member apparatus for dispensing individual ties from the gravity conveyor to the horizontal conveyor and operation of same.
Figure 3A:
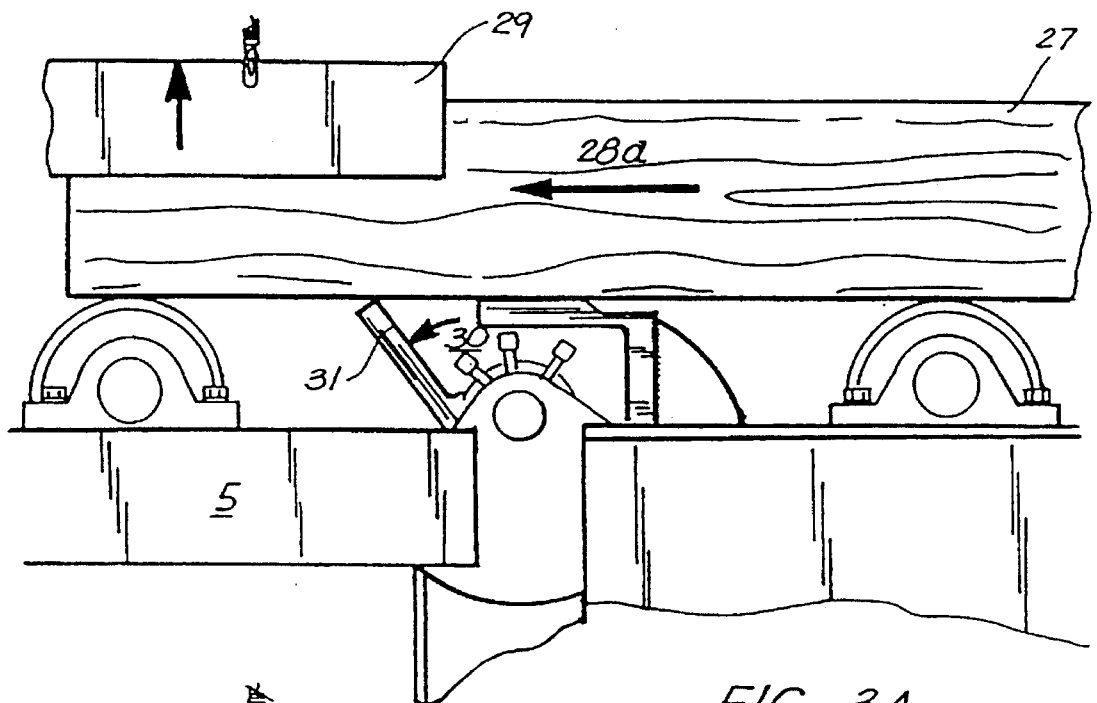
FIG. 3A is a side view of the cross-tie pre-plating apparatus of the present invention of FIG. 1A, illustrating the blocking member of the horizontal conveyor.
Figure 3B:
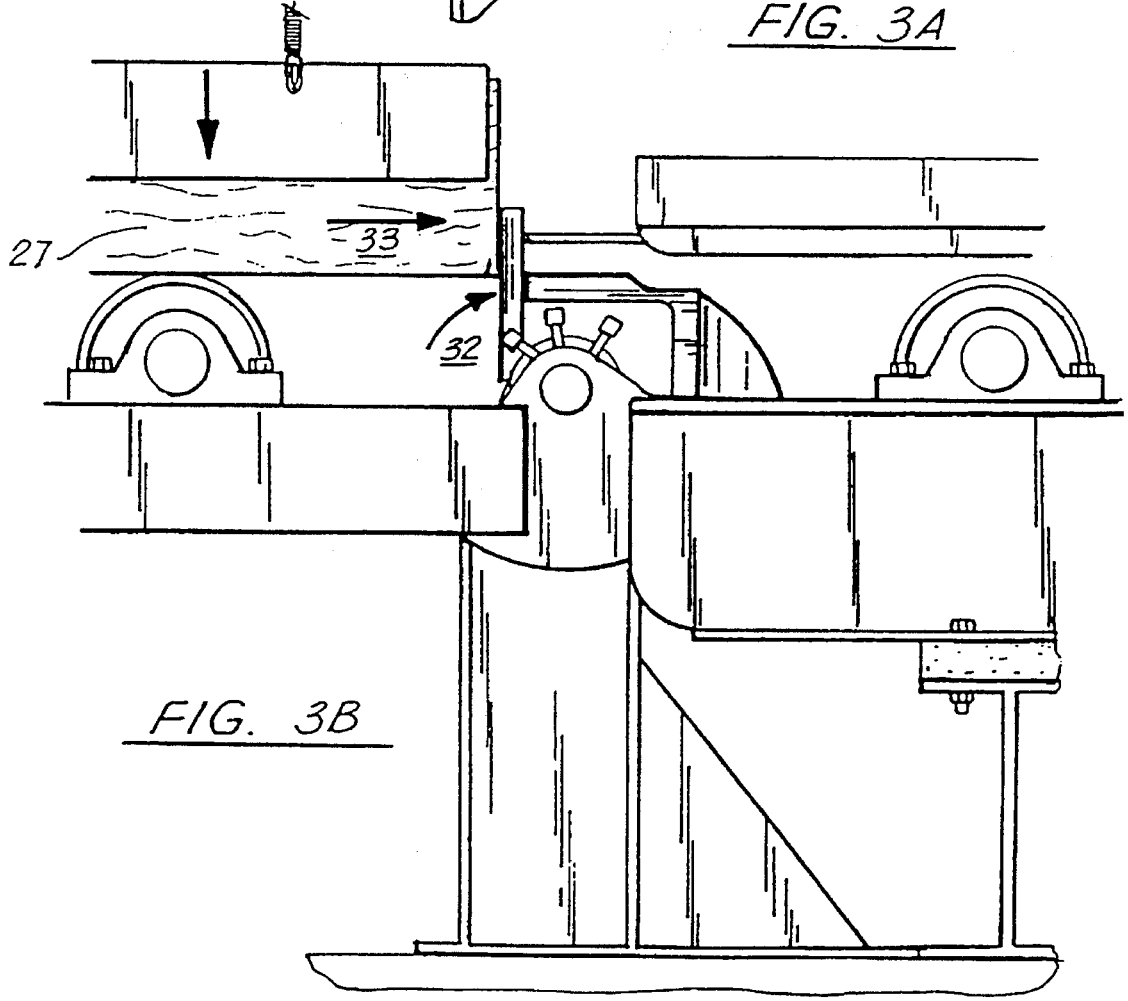
FIG. 3B is a side view of the cross-tie pre-plating apparatus of the present invention of FIG. 3A, further illustrating the blocking member of the horizontal conveyor.

As shown in FIGS. 2A and 2B, the railroad ties 1 are dispensed individually to the horizontal conveyor 5 via the second, lower end 4 of the gravity conveyor, which utilizes an operator actuated blocking member 22, configured to hold back the bulk of railroad ties 1 and dispense a single loaded tie 27 upon demand. As shown, a reciprocating piston 24 is actuated, lowering 23 the blocking member 22, dispensing a railroad tie 1 from the bulk of ties, providing a dispensed tie 27 upon the horizontal conveyor 5. Upon the loading tie passing over switch 25, the rocker arm is raised momentarily, initiating piston 24 to raise the blocking member 22, holding back the bulk ties until the next cycle.

Once the tie 27 is loaded onto the horizontal conveyor 5, it is directed 28a via the conveyor rollers under the upper template 29 of the plating area, the tie directing 30 a blocking member 31 to rotate about a pivot point. The blocking member is weighted to return to its blocking position 32 once the tie has cleared the blocking member. After the tie has cleared the blocking member, the conveyor is reversed by the operator, directing the tie back 33 towards the blocking member 31 until the tie intersects with same, thereby positioning the tie in the appropriate longitudinal position with the plating apparatus.

Figure 4A:
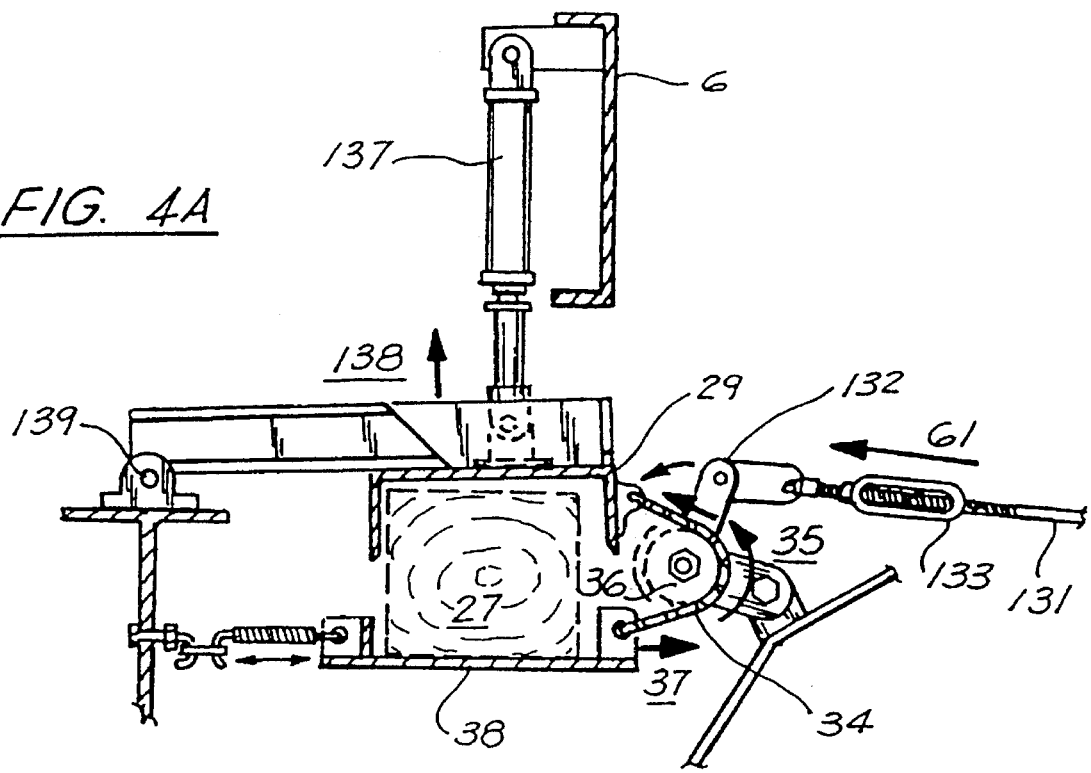
FIG. 4A is an end view of the cross-tie pre-plating apparatus of the present invention of FIG. 1A, illustrating the operation of the plating area and template.
Figure 4B:
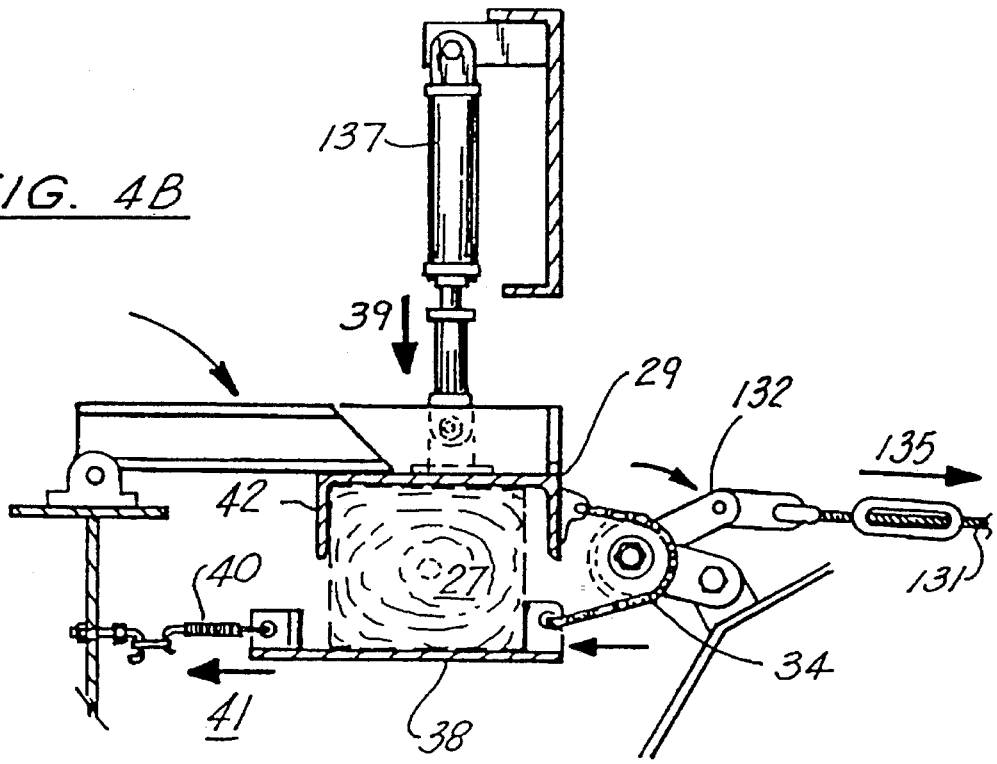
FIG. 4B is an end view of the cross-tie pre-plating apparatus of the present invention of FIG. 4A, further illustrating the operation of the plating area and template.

As shown in FIGS. 4A and 4B, the plating area 6 of the present invention includes an upper template 29 and a lower template 38 configured to accept the loaded tie 27. The template is configured to provide multiple functions, including positioning the tie laterally and plate thereon. In order to provide consistent tie placement on the ties, each tie must be positioned under the template in a consistent and accurate fashion. Positioning the tie in longitudinal fashion is disclosed in the above paragraph. With regard to positioning the tie laterally, the lower template 38 is configured to migrate 37, 41 in lateral fashion relative the horizontal conveyor in response to the up and down movement of the upper template 29.

Further referring to the drawings, reciprocating piston 137, directed by the operator, is retracted, lifting 138 the upper template 29 which is pivotally connected 139 at the back end, allowing clearance for the placement therein of the tie 27. Before placement of the tie, however, the operator must then further lift 138 the upper template 29 via further retracting of the piston 137, causing lateral movement 37 of the lower template 38 towards the platform, the lower template's 38 movement due to its connection with upper template via chain 34, which is in turn directed through sprocket 36. When the template is lifted, this causes counter-clockwise rotation 35 of the sprocket 34, which in turn pulls 37 the lower template toward the platform, aligning the upper and lower templates for insertion of the tie 27 therein via the horizontal conveyor.

Upon insertion of the tie 27 via the horizontal conveyor by the operator, the reciprocating piston 137 is then directed by the operator to extend, lowering 39 the upper template 29, causing clockwise rotation of the sprocket via the chain 34, allowing spring 40 to pull 41 the lower template 38 and tie 27 back away from the platform to the appropriate lateral position for installation of the tie, the blocking member 42 holding the tie 27 at the appropriate position, in conjunction with spring bias via spring 40.

As shown in FIGS. 5A and 5B, the central conveyor 5 of the present invention includes a support spring 127 supported section immediately below the template area. Referring to FIG. 5A, the spring supported section is configured such that when downward force 129 is exerted upon upper template 29 via piston 137, said force is translated 130 to lower the lower template and central conveyor area support 43 via tie 27. In order to provide support for the spiking operation, and prevent damage to the rollers, the central conveyor area is configured to be displaced downward 130 such that the central conveyor area support 43 is resting upon base support 128. After the spiking operation, the piston 137 retracts, allowing the support spring 127 to raise the central conveyor area support to the level of the rest of the conveyor, allowing the tie to be removed via same.

Figure 6:
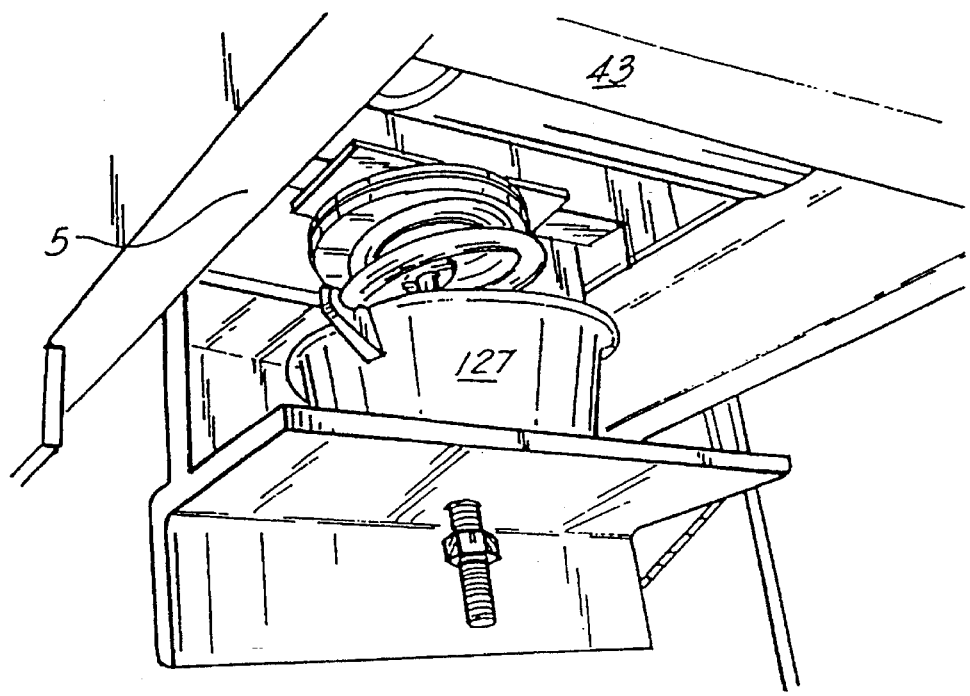
FIG. 6 is a side view of the cross-tie pre-plating apparatus of the present invention of FIG. 1A, illustrating the support spring of the central conveyor piece.

FIG. 6 illustrates a close-up view of the support spring 127, which is affixed to base 128, the upper portion communicating with the central conveyor area support 43 of the horizontal conveyor 5.

Figure 7:
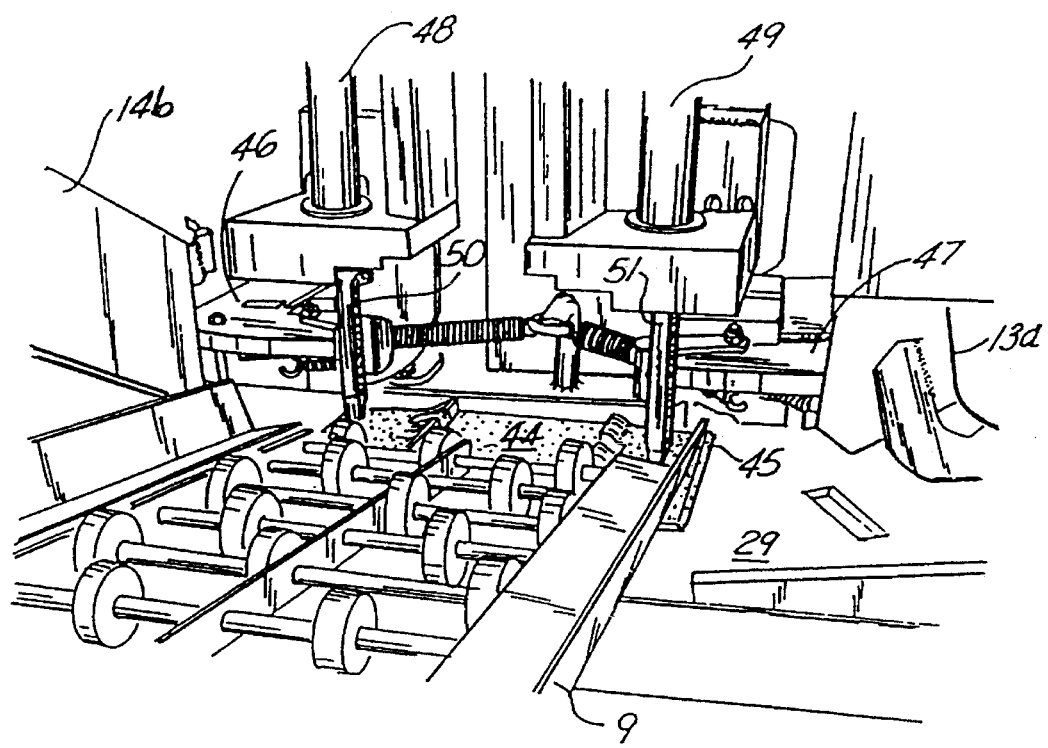
FIG. 7 is a frontal isometric view of the cross-tie pre-plating apparatus of the present invention of FIG. 1A, illustrating the rail plate conveyor piece communication with the pre-plating area.

FIG. 7 illustrates the lower end of the second gravity plate conveyor, and its juxtaposition to the lowered template 29, such that a released rail plate 44 from the conveyor 9 falls in the vicinity of the template plate cut 45. Further shown is the position of the second, lower end of the inner spike gravity conveyors 13a, 14b, each configured such that their dispensed spikes 50, 51 are within reach of their respective spike manipulation arms 46, 47, for fastening the template 44 to the tie via pistons 48, 49, respectively.

Figure 8A:
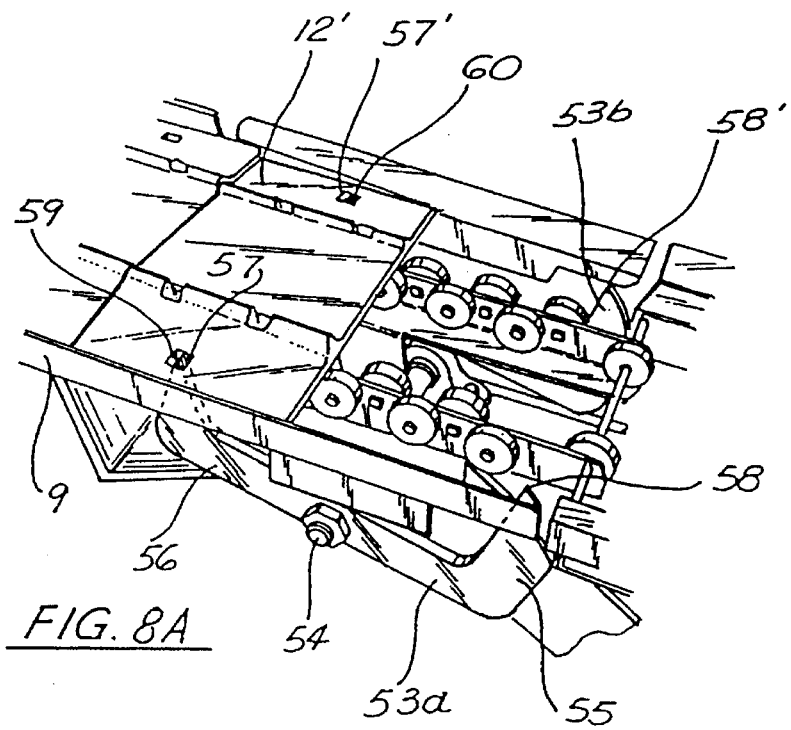
FIG. 8A is an isometric view of the cross-tie pre-plating apparatus of the present invention of FIG. 1A, illustrating the plate conveyor and pivotal loading member.
Figure 8B:
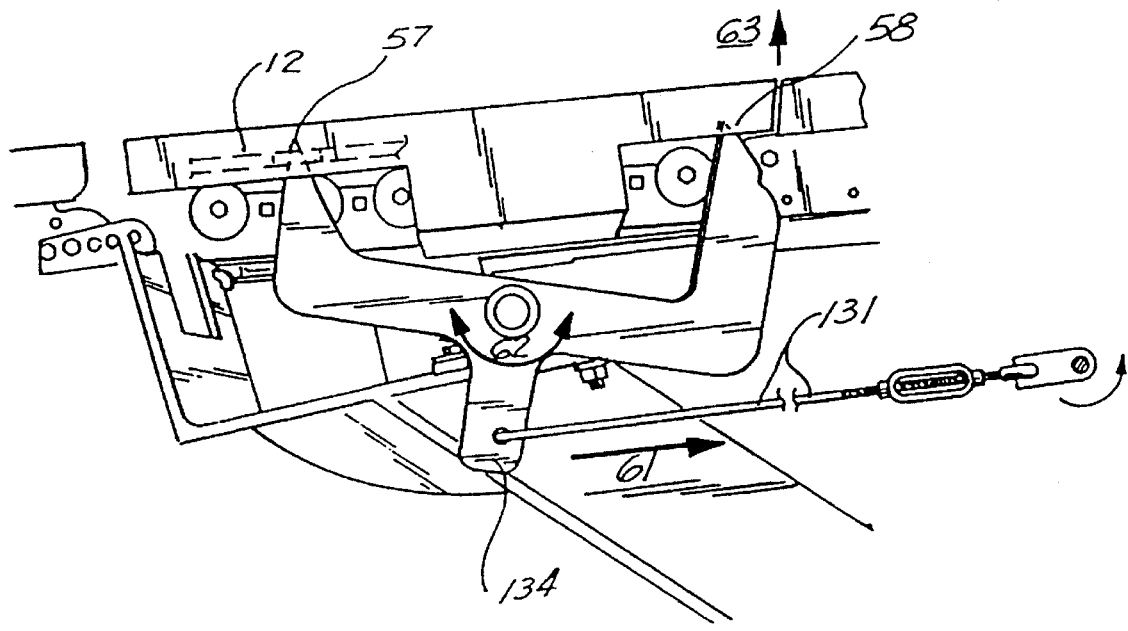
FIG. 8B is a side view of the cross-tie pre-plating apparatus of the present invention of FIG. 8A, illustrating the operation of the pivotal loading member, dispensing a plate.

FIGS. 8A and 8B illustrate the means by which individual rail plates are dispensed from the gravity conveyor 9 from the bulk of loaded plates. As shown, the rail plates 12 are loaded upon the conveyor one after another in single tier fashion, from the first, higher end of the conveyor. Rollers or the like allow gravity to draw the loaded ties to the second, lower end of the conveyor, wherein the first plate 12' comes into contact with first and second rocking loader members 53a, 53b, each member having a common pivotal axle 54, and an arm having first 55 and second 56 ends, each end having a vertical, upward disposition ending in points 57, 57', and 58, 58' respectively, forming a first, forward point holding mechanism, and second, lower point holding mechanism, respectively.

As shown, rocking loading members are configured relative the gravity conveyor for the plates such that the first, forward points 57, 57' of the rocking loader members 53a, 53b contacts the plate spike apertures 59, 60 of the first loaded spike, respectively, preventing further migration of the plate and any plates following.

The plates are dispensed individually by the selective, automatic pivoting 62 of said loader members 53a, 53b, lowering the first, forward points 57, 57', releasing the forward plate 12', allowing said plate to further traverse the gravity conveyor 9. Upon the lowering of the first, forward points 57, 57', the rocking loader members 53a, 53b are pivoting 62, thereby raising 63 the second, lower points 58, 58'; the system is configured such that the second, lower points 58, 58' are raised into the gravity plate conveyor 9 area so as to intersect with the leading edge of the forward, released plate 12', holding it in place prior to final dispensing into the rail plating area.

As further illustrated in FIGS. 4A, 4B and 8A, 8B, the rocking loader members 53a, 53b are selectively pivot via 63 via control rod 131 assembly pivotally affixed 134 to one of the two rocking loader members at their first end, as shown in FIGS. 8A and 8B. As shown in FIGS. 4A and 4B, the second end of control rod 131 is pivotally affixed to pivot connection 132, which is affected by and in connection with sprocket 36.

Referring to FIGS. 4A and 8B, when piston 137 is retracted from its extended position, forcing upper template 29 up 138 so as, for example, to allow the passage of a tie 27 thereunder, sprocket 36 is directed in a counterclockwise 35 fashion via chain 34; consequently, pivot connection 132 is likewise directed in a counterclockwise fashion, toward the machine, pulling 61 control rod 131 and the rocker piece 134 of the loading members 53a, 53b, thereby lowering tips 57, 57', releasing the first tie 12', until it is stopped by its first edge contacting the raised 63 second tips 58, 58'.

As further shown, control rod 131 includes an adjustment piece 133 for adjusting the system such that the lifting of the upper template provides sufficient rotation of sprocket 36 to provide adequate linear movement 61 for pivoting 62 from adequately lifted first tips for supporting the ties lowered first tips and adequate lifted second tips for supporting the tie 12'.

Figure 9A:
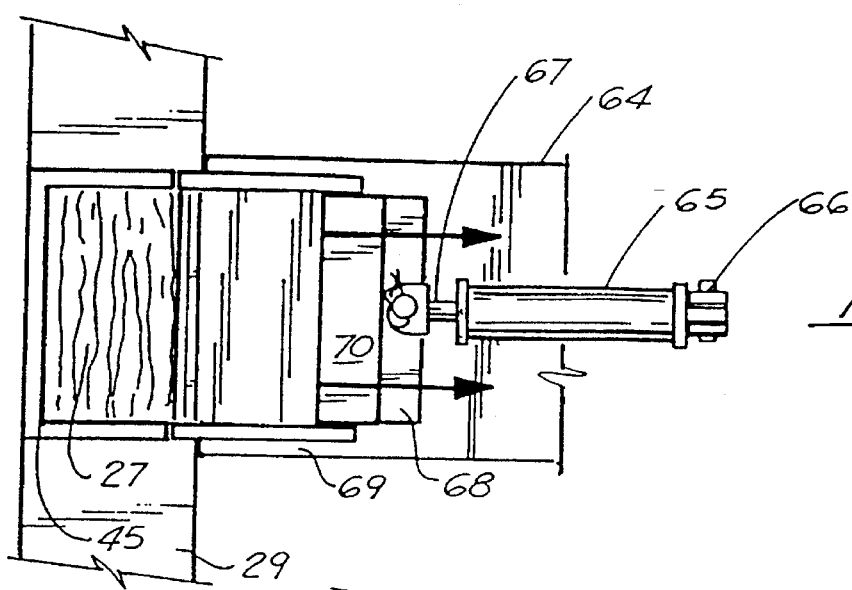
FIG. 9A is a top view of the cross-tie pre-plating apparatus of the present invention of FIG. 1A, illustrating the plate positioning apparatus.
Figure 9B:
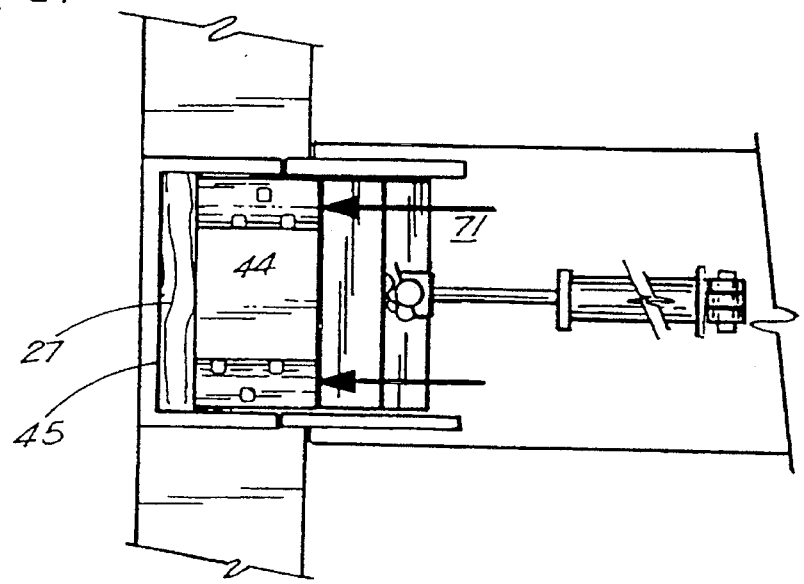
FIG. 9B is an isometric view of the cross-tie pre-plating apparatus of the present invention of FIG. 9A, illustrating the plate positioning apparatus, loading a plate onto the template.
Figure 9C:
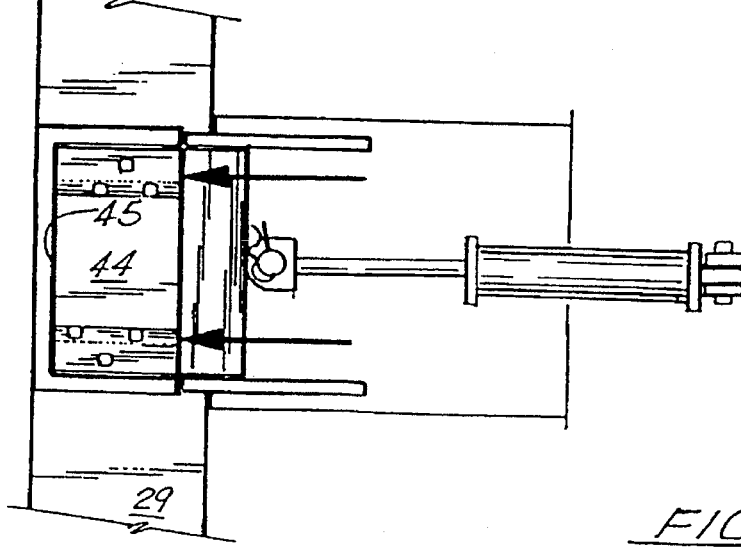
FIG. 9C is an isometric view of the cross-tie pre-plating apparatus of the present invention of FIG. 9B, further illustrating the plate positioning apparatus, loading a plate onto the template.

Likewise, as shown in FIG. 4B, when piston 137 is extended downward 39, such as when a tie has been positioned under the template for plating, sprocket 36 is directed in a clockwise direction, directing rod 131 via pivot connection 132 away from the template and plating area, said action translated via said rod to the loading members, lowering the second tips 58, 58', releasing the plate held thereby to be drawn by gravity down the conveyor, dropping in the area of the template cut for said plate for fastening upon the tie, while simultaneously the first tips 57, 57' of the loading members are raised, preventing migration of more than the dispensed tie from the bulk of ties on the conveyor until the next cycle, when the tie is raised, and the cycle begins again. FIGS. 9a–9c illustrate a plate positioning apparatus provided in conjunction with the first and second template plate slots, for utilization in assisting exact placement of the dispensed plate from the gravity plate conveyors 8,9. These apparatus are each longitudinally aligned and displaced at least in part under each of the respective gravity plate conveyors with which each apparatus operates.

As shown in FIG. 9a, the plate positioning apparatus 64 comprises an operator controlled reciprocating piston 65 having first and second sides, the first end 66 affixed to the platform 7 or an extension of the horizontal conveyor, the second end 67 comprising the moveable piston shaft affixed to a plate manipulation piece 69, configured to engage and manipulate a plate deposited from the respective gravity conveyor, above the apparatus, and position said plate within the plate cut 45 in the template for fastening of the plate to the tie 27. As shown, the piston is aligned so as to provide forward and rearward 70 longitudinal motion of the plate manipulation piece; the piece 69 is itself slidingly engaged 68 to a base member. FIG. 9a illustrates the plate manipulation piece withdrawn to its full acceptance position, ready to accept a plate to be deposited from the above gravity plate conveyor.

As illustrated in FIG. 9b, the gravity plate conveyor has deposited a plate 44, which has come to rest generally aligned with the template plate cut, but short of the appropriate placement. The operator merely initiates the piston, pushing the piston shaft towards 71 and against the outer edge of the dispensed plate 44, pushing same into the template plate cut 45 and over the tie 27.

FIG. 9c illustrates the completion of the installation of the dispensed plate 44 into the template plate cut 45 of template 29; the piston is now ready to be fully withdrawn for driving of the spikes, in order to fasten the plates to the railroad tie. It is reiterated that there is provided in the present system first and second plate manipulation pieces, corresponding to the first and second gravity plate conveyors, and first and second template plate cuts; both of the plate manipulation pieces 65 are configured to be operated by the operator simultaneously after the template is lowered, and the plates have been dispensed by the gravity plate conveyors, as discussed supra.

Figure 10:
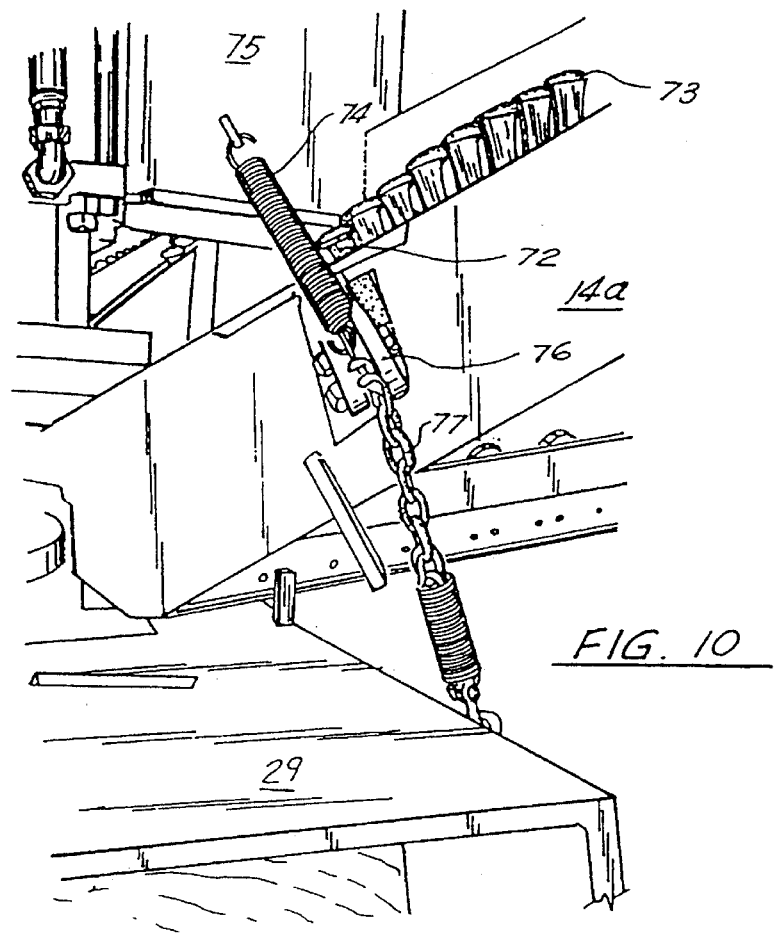
FIG. 10 is an isometric view of the cross-tie pre-plating apparatus of the present invention of FIG. 1A, illustrating the spike feeder and its communication with the template.

As shown in FIG. 10, the spikes in the outer spike feeders are fed utilizing an actuation means in some respects similar to the plate feeder means disclosed in the discussion of 8a,b and 4A, B, in that the actuation is accomplished utilizing bias provided by the vertical, up and down motion of the upper template. As shown, template 29 has affixed to it a spring/chain arrangement 77, the other end of which contacts a pivotal spike feeder mechanism 76, the spring/chain arrangement 77 providing downward bias when the template 29 is lowered.

Also illustrated is upper bias or feed spring 74 having first and second ends, the first end affixed to the template support frame 75, the second end affixed to the pivotal spike feeder mechanism 76, thereby providing upper bias to same. The arrangement of the upper bias or feed spring 74 is illustrative of that utilized on the outer (14a, 13b as shown in FIG. 1A) spike feeders, as the inner spike feeders (14b, 13a in FIG. 1A) do not utilize the template support frame 75 for supporting the upper spring, relying upon a support piece emanating from the spike feeder instead, as will be more fully shown.

As will also be more fully explained infra, the spike feeder mechanisms, comprising four in all, each situated at the lower ends of the gravity spike feeders or conveyors, juxtaposed the plating area, are configured to dispense one spike 72 at a time, while holding back the remaining spikes 73 on the gravity spike feeder 14a.

Figure 11:
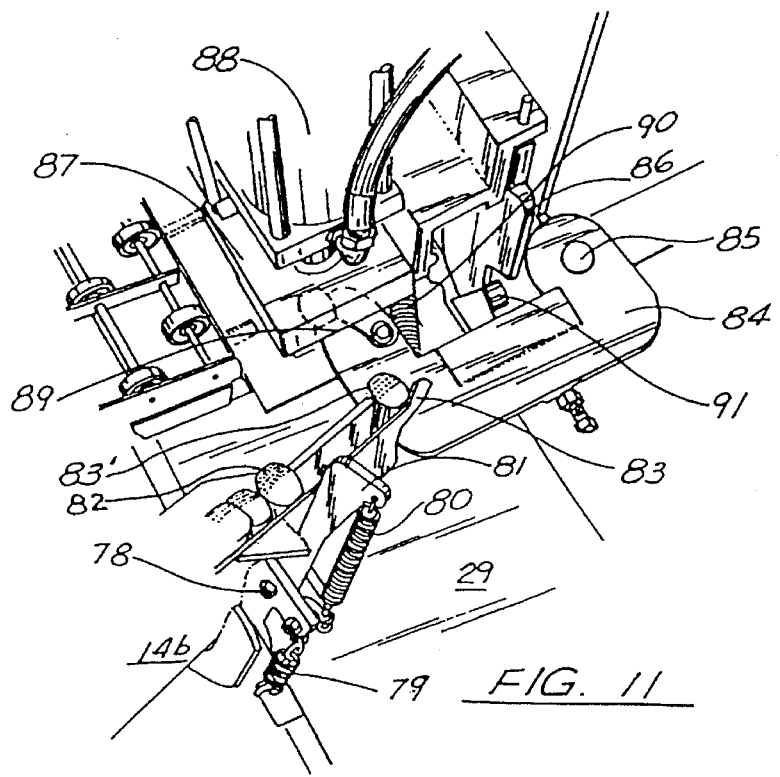
FIG. 11 is s top, isometric view of the cross-tie pre-plating apparatus of the present invention of FIG. 1A, further illustrating the spike feeder, and its communication with the template and spike manipulation arm.

As shown in FIG. 11, the dispensed spike 83' is held in place at the end of the spike feeder 14b via lip 83, exposing the body of the spike as it hangs at the end of the feeder so that it may be grasped and manipulated by the spike manipulation arms 84 magnetic spike holder 89. As shown, the spike manipulation arm 84 is configured to pivot 85 from a spike grasping position, wherein it magnetically grasps the dispensed spike 83, to a spike driving position, wherein it positions the spike over the spike aperture on the rail plate, so that said spike may be driven via piston 88 shaft press 87.

The spike manipulation arm 84 is positioned in its two respective positions, i.e., spike grasping position and spike driving position, via the utilization of a vertical travel manipulation template 86 affixed to the shaft press 87 and which travels up and down with the extension and retraction of said shaft press 87, urging the manipulation arm in the appropriate position in conjunction with the vertical position of the shaft press 87.

Roller 91 affixed to the spike manipulation arm 84, contacts the manipulation template 86, while spring 90 holds the spike manipulation arm in contact with said manipulation template 86. The operation of the spike manipulation arm will be discussed in more detail infra.

Further illustrated in FIG. 11 is spike feeder mechanism 78 as utilized with the inner spike feeders 14b (and 13a in FIG. 1A); as illustrated, these spike feeders operate largely the same as those in the discussion of FIG. 10, supra, except that the upper feed spring 80 is affixed to a spring support piece 81 extending from the spike feeder 14b, unlike the outer spike feeders, whose upper spring support piece is affixed to the template support frame. Other than this difference, the operation is the same; the spike 82 is dispensed based upon the vertical movement of the template 29 via spring/chain arrangement 79, with the upper spring 80 providing the upward bias.

Figure 13:
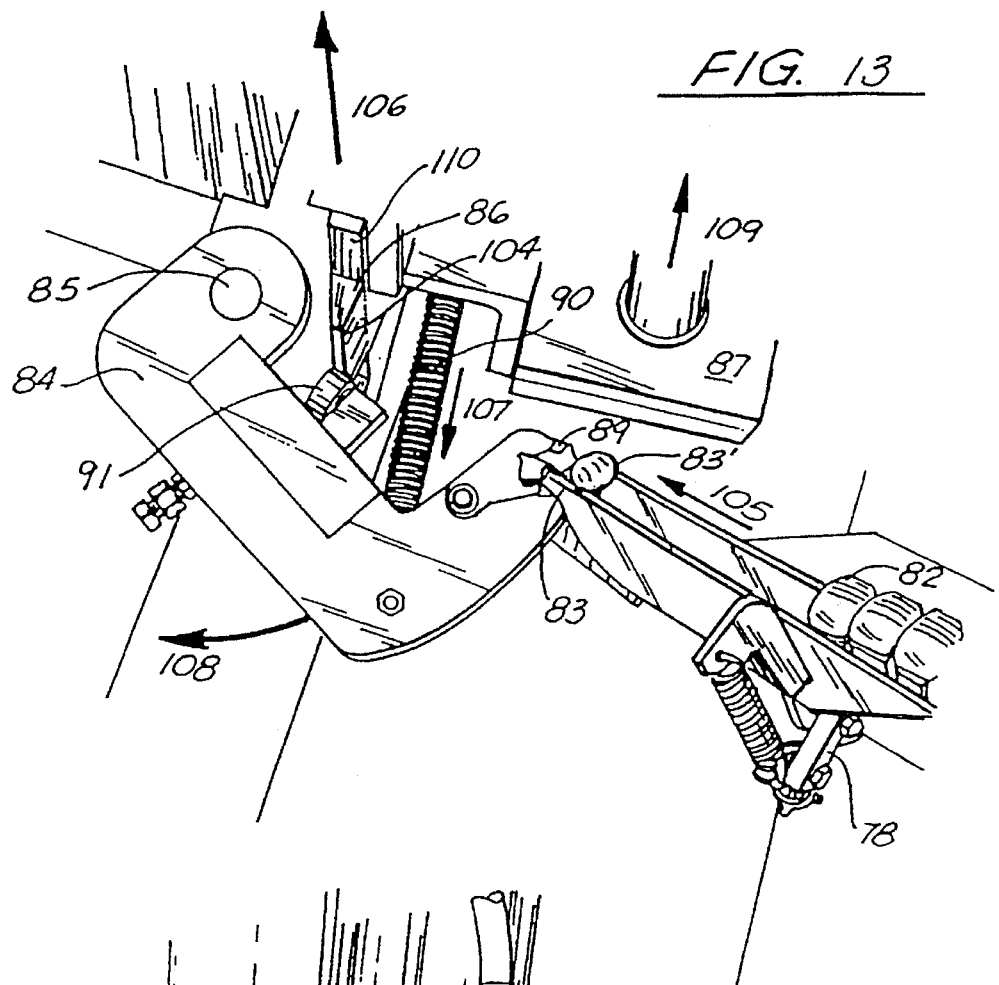
FIG. 13 is an isometric view of the cross-tie pre-plating apparatus of the present invention of FIG. 1A, illustrating the spike manipulation arm grabbing a dispensed spike from the spike gravity feed.
Figure 14:
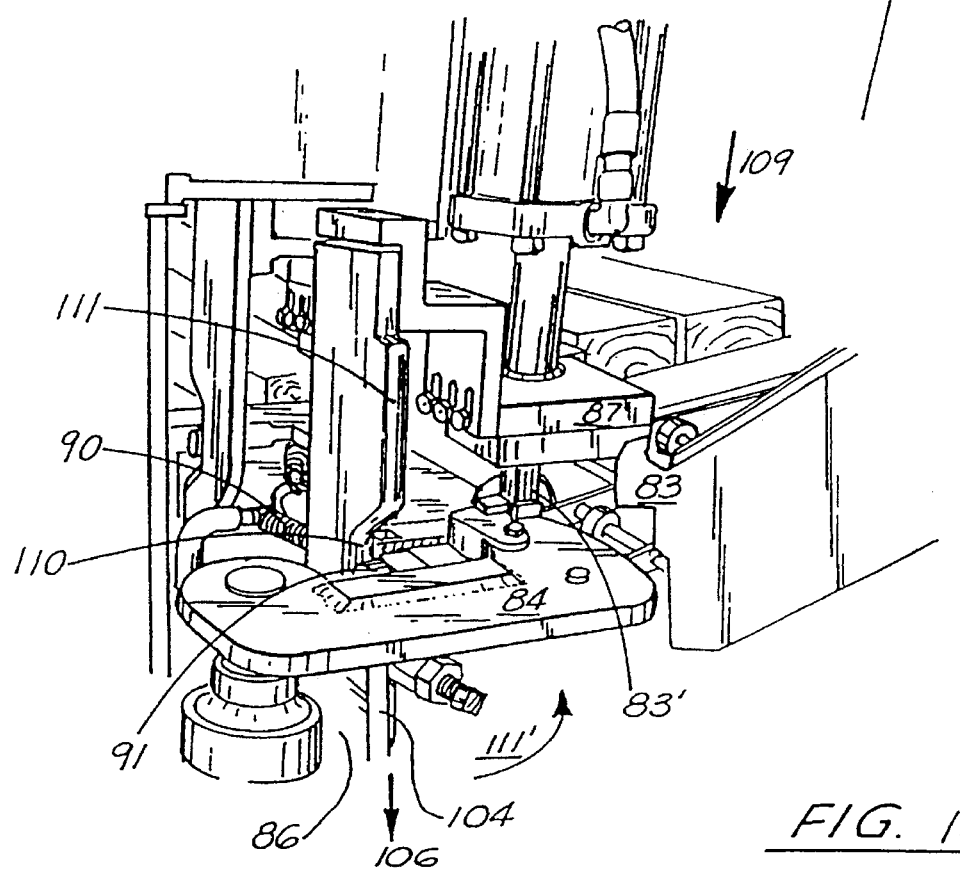
FIG. 14 is an isometric view of the cross-tie pre-plating apparatus of the present invention of FIG. 1A, illustrating the placement of the spike in the appropriate driving position via the spike manipulation arm.

FIGS. 13 and 14 further illustrate the operation of the piston manipulation arms of FIGS. 7 and 11. As shown in FIG. 13, with the piston shaft press piece 87 fully retracted and in its most upward 109 position, the manipulation template 86, being attached to the press piece 87, is also in its most upward position 106. FIG. 15a illustrates the roller 91 and spike manipulation arms 84 position relative the manipulation template 86. At this point, with the shaft press piece 87 at its uppermost, 109 retracted position 112, and the spike manipulation arm forced outwards 113 from the template due to the lower, outer portion 104 of same, the outer portion 104 is configured to urge the spike manipulation arms 84 magnetic spike holder 89 away 108 from the press area and into physical and magnetic contact with the dispensed spike 83 held at the base of the spike feeder via lip 83, grasping said spike via magnetic spike holder 89, as shown in FIG. 13. As further shown, spring 90 urges the spike manipulation arm 84 against the manipulation template, expanding 107 with the outward movement 108 of said arm.

FIG. 14 illustrates the shaft press piece 87 of the piston in its medial position, with said piece 87 about to contact the head of spike 83', held in place for driving into the railroad tie via spike manipulation arm 84. Referring to FIGS. 14 and 15b, spike manipulation arm 84 has been urged with the spike 84 into position via the medially lowered spike manipulation template 86, which has been lowered via its connection with the shaft press piece 87, such that said templates 86 medial cut 110 is in contact with spike manipulation arm 84 and roller 91, urging 111 via spring 90 the manipulation arm 84 to pivot via pivotal connection 85 into the appropriate position for driving the spike 83.

Again referring to FIG. 15b, note that the boundary cuts 104', 111" juxtaposed the medial cut 110 and the lower 104 and top 111 outer template cuts, respectively, are sloped at about 45° to provide for gradual manipulation of the roller 91 and the spike manipulation arm 84 from an extended, outer position to an inner, retracted position, and visa versa.

Referring to FIG. 15c, the template 86 is further provided with an upper, outer cut 111 so as to urge the spike manipulation arm 84 clear of the shaft press piece 87, once said piece has contacted and begun driving the spike, via the continued downward 106 movement of the shaft press piece 87 and connected template 86. As shown, with the continued downward movement 106, the roller 91 and spike manipulation arm 84 moves from the inner, retracted position when said roller is in contact with the medial, inner cut 110 to the outer, extended position, away from the spike driving shaft press piece 87, via said rollers contact with the sloped boundary cut 111", and ultimately the upper, outer cut 111. After the shaft press piece 87 has driven the spike all of the way into the tie, fastening the plate to the tie, the operator then fully retracts the piston, and the apparatus is ready for the next cycle.

Figure 12A:
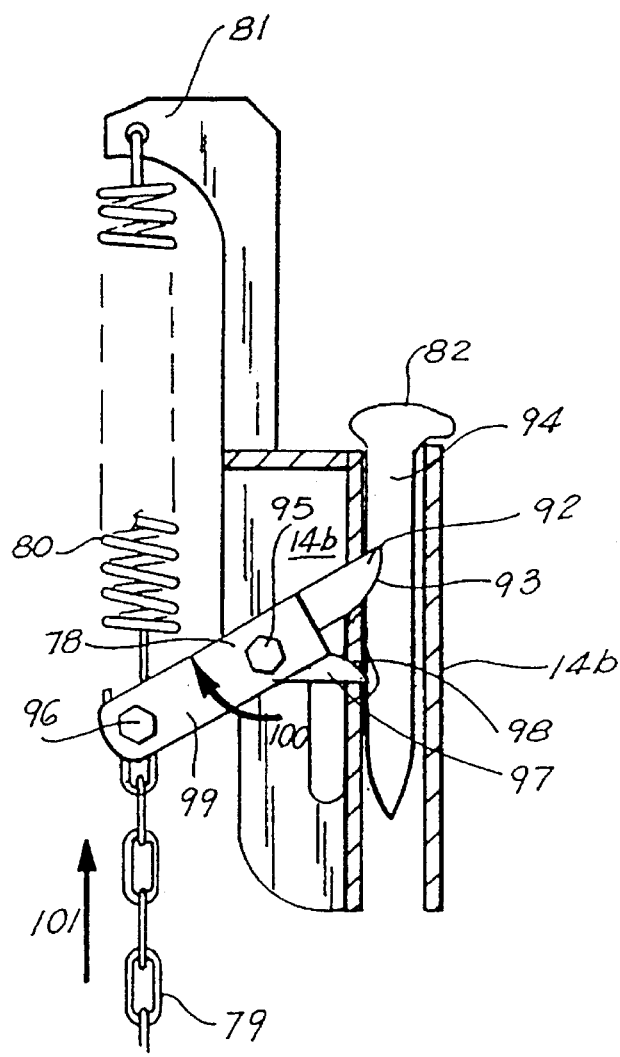
FIG. 12A is a side view of the cross-tie pre-plating apparatus of the present invention of FIG. 1A, illustrating the operation of the spike feeder mechanism of the spike gravity feed.
Figure 12B:
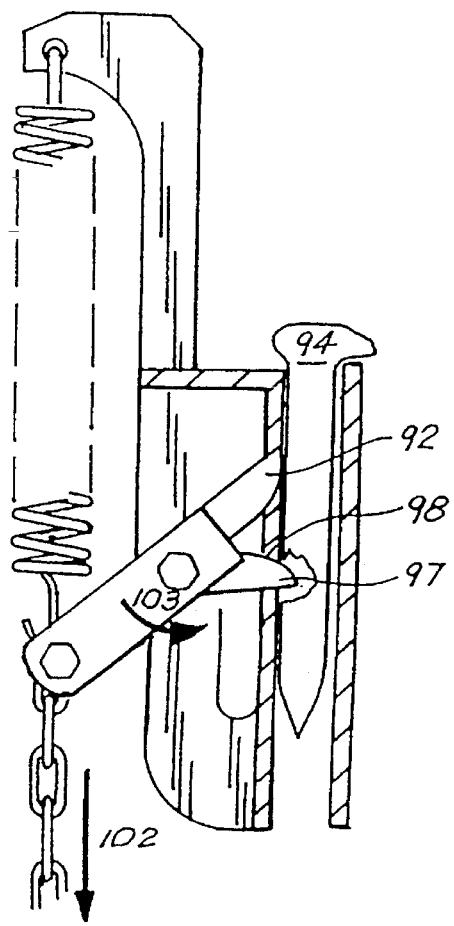
FIG. 12B is an isometric view of the cross-tie pre-plating apparatus of the present invention of FIG. 12A, further illustrating the operation of the spike feeder mechanism of the spike gravity feed.

FIGS. 12a and 12b provide greater detail as to the operation of the spike feeder mechanism 78 of the gravity spike feeders 14b of the present invention; it is noted that the feeder mechanism 78 operates in the same manner for all of the gravity spike feeding systems, including both the inner (14b, 13a in FIG. 1A) and the outer (14a, 13b in FIG. 1A) spike feeding systems.

Returning to FIG. 12a, the spike feeder mechanism 78 comprises front 92 and rear 97, spaced dispenser blades, having an lower 93 and upper 98 blade disposed thereon, respectively. The front 92 and rear 97 blades are spaced such that the front blade 92 holds the spike 82 to be dispensed in place, with engaging the front face 94 of the spike, while the rear blade 97 is configured to hold back the rest of the spikes in the spike feeder 14b while the front blade is raised, the front and rear blades to provide selective dispensing of a single spike with the raising and lowering of the upper template. Thus, the front and rear dispenser blades are spaced so as to allow the passage of a single spike therebetween. As shown, these blades are affixed to an common actuation bar 96, which is configured to pivot via connection 95. Lower feed spring/chain arrangement 79 as discussed supra, is affixed to the upper template at its lower end, and is affixed 96 pivotally to the actuation bar 99 at the other end. When the template is raised 101, the upper feed spring 80, affixed to support piece 81, provides bias to the actuation bar, pulling on same and causing the actuation bar to pivot 99, lowering the front dispensing blade, configured in this position to prevent the migration of spikes from the feeder, while also lowering the rear dispensing blade,, configured at this position to no longer block the feeder, allowing the migration of the spikes forward to intersect the now blocking front dispenser blade 92, holding the spikes in place. As the template is raised, a plated tie can now be removed, and an un-plated tie can now be placed under the template and positioned.

As shown in FIG. 12b, once the template is lowered 102; the actuation bar is pivoted in counterclockwise, fashion 103, raising the front blade 92 and rear blade 97. The rear blade 97, being spaced the width of a single spike from the front blade 92, said rear blade 97, with its curved, upper blade 98 portion, is cuts between the spike 94 to be dispensed and the next spike, holding the next spike back, while the spike 94 to be dispensed is released by the now raised front blade 92; said spike slides down the remainder of the spike feeder, to the end of the feeder, where it is held for retrieval by the spike manipulation arm for placement in the appropriate position for fastening the railroad plate to the tie.

Figure 16A:
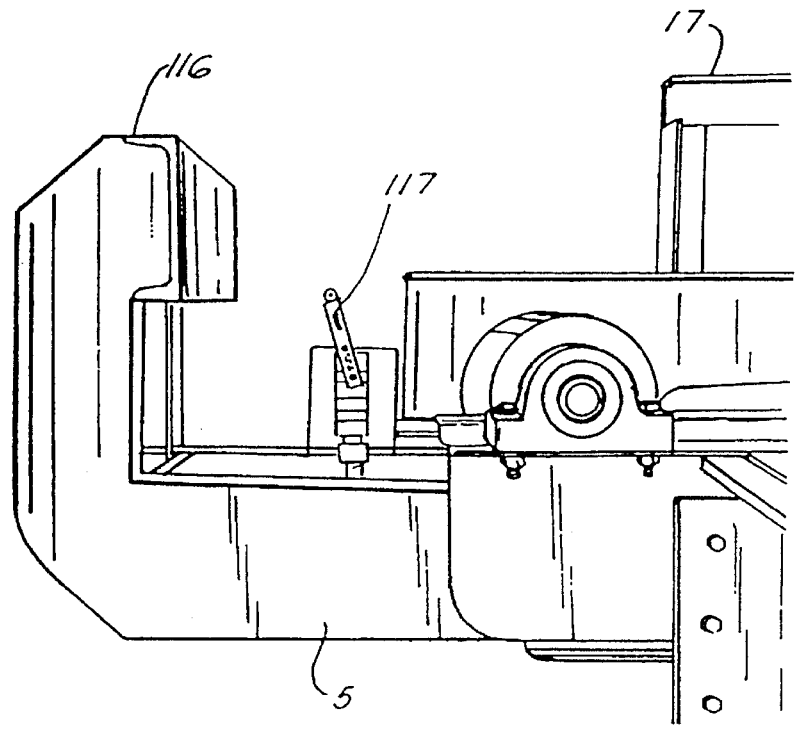
FIG. 16A is a side view of the cross-tie pre-plating apparatus of the present invention of FIG. 1A, illustrating the end of the horizontal conveyor and kicker mechanism associated therewith.
Figure 16B:
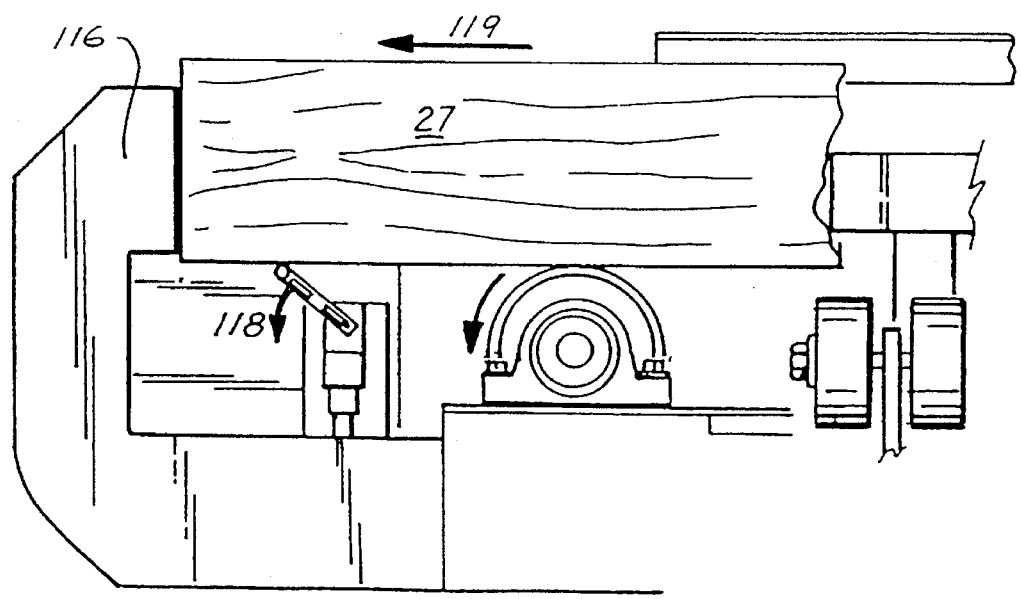
FIG. 16B is a side view of the cross-tie pre-plating apparatus of the present invention of FIG. 16A, illustrating the end of the horizontal conveyor and kicker mechanism associated therewith, further illustrating the initiation of the kicker switch via the dispensed tie.

As illustrated in FIGS. 16A and 16B, after the rail plates have been fastened to the tie as set forth in the specification supra, the processed tie is discharged from the template area via the horizontal conveyor 5, initiates 118 kicker switch 117, until the tie 27 communicates with bumper 116, at which point the tie is in position to be discharged from the horizontal conveyor 5 to the gravity dump conveyor via kicker 17.

Figure 17A:
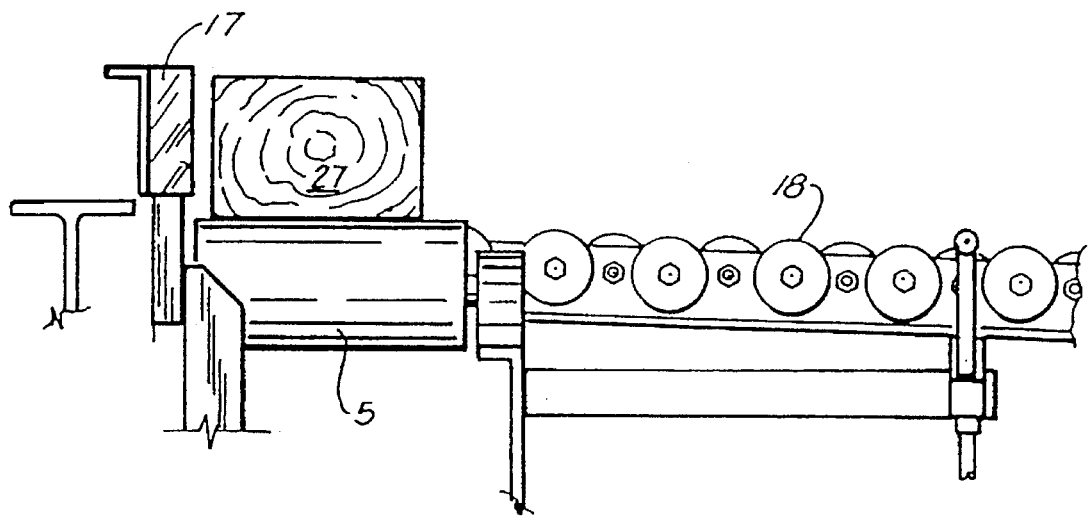
FIG. 17A is an end view of the cross-tie pre-plating apparatus of the present invention of FIG. 1A, illustrating the end of the horizontal conveyor and the gravity dump conveyor connected laterally therewith.
Figure 17B:
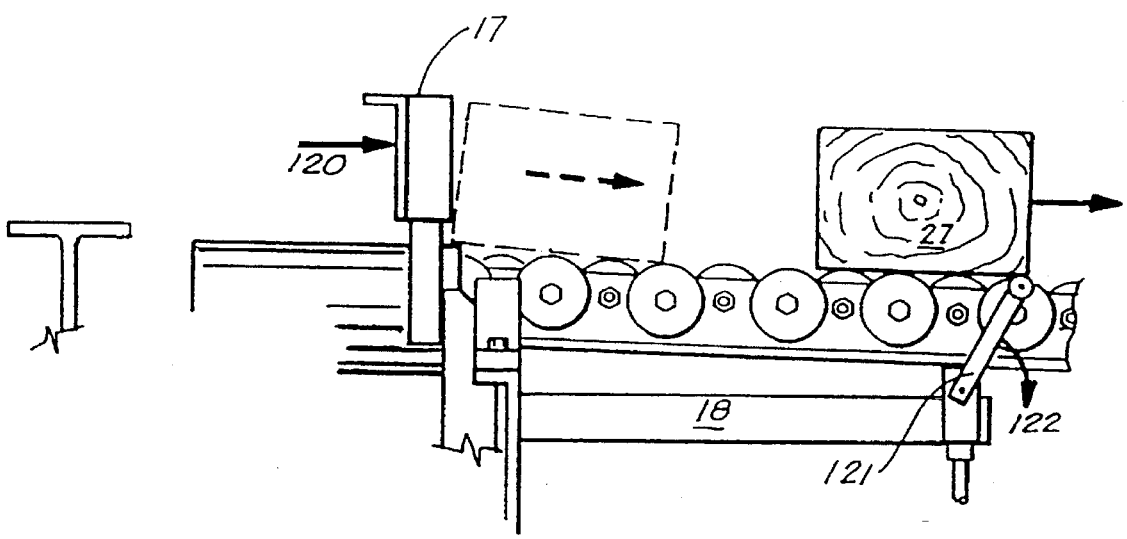
FIG. 17B is an end view of the cross-tie pre-plating apparatus of the present invention of FIG. 16A, illustrating the end of the horizontal conveyor and gravity dump associated therewith, further illustrating the initiation of the kicker dumping the dispensed tie on to the gravity dump.

FIGS. 17A and 17B illustrate the operation of the kicker mechanism at the end of the horizontal conveyor. As shown in FIG. 17A; the kicker 17 is juxtaposed the back wall of the horizontal conveyor 51, opposite the gravity dump conveyor 18. Referring to FIG. 17B, once the kicker switch (118 in FIG. 16B) has been initiated, indicating that the processed tie is in position, a hydraulic piston or the like initiates kicker 17 forward 120, forcing tie 27 on to the gravity dump conveyor 18. The tie 27 is drawn along said conveyor to the lower, opposite end via rollers or the like, passing over actuation switch 121, initiating same 122, thereby re-setting the kicker back to its standby position, as shown in FIG. 17A.

Figure 18:
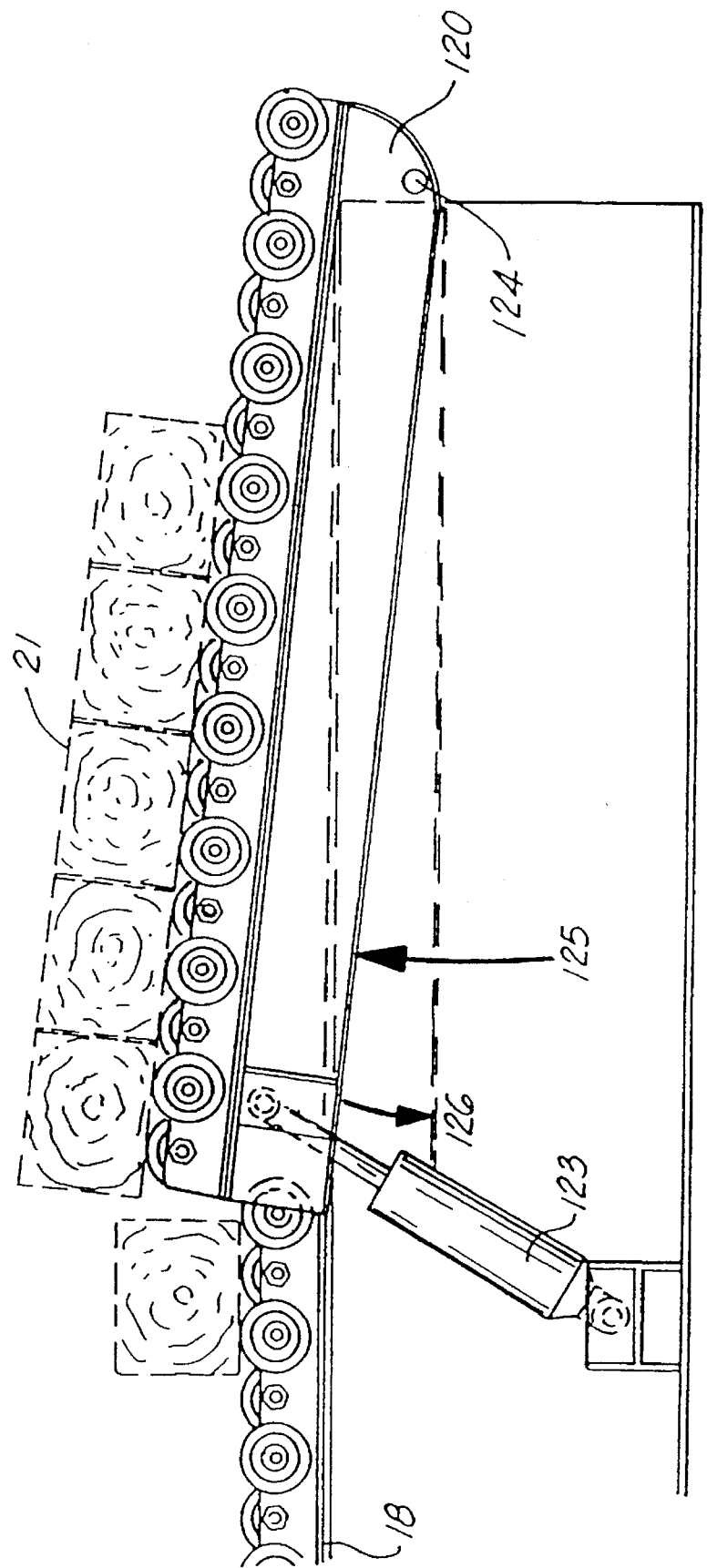
FIG. 18 is an end view of the cross -tie pre-plating apparatus of the present invention of FIG. 16A, illustrating the end of the gravity dump, and tie dumping system associated therewith.

Finally, FIG. 18 illustrates an optional mechanism affixed to the second, lower end 20 of the gravity dump conveyor 18 the mechanism includes first and second ends, the second end the same as the second end of the gravity dump conveyor, said second end including a pivot connection 124 to a frame, with the first end including a liftable piece connected to a reciprocating piston 123 or the like. This apparatus may be the length sufficient to support 6–10 laterally arranged ties, and is particularly useful for discharging a bundle of ties from the gravity dump. As shown, the piston may extend 125 to lift the piece to urge the ties (bundled or unbundled) off of the dump, with the piston retracting 126 upon discharging.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A railroad cross-tie pre-plating system for fastening a rail plate to a cross-tie, comprising:

a generally horizontal conveyor having first and second ends, and a medial area generally therebetween:

a pre-plating apparatus juxtaposed said horizontal conveyor, said pre-plating apparatus further comprising:

a pre-plating area for manipulating and pre-plating a cross-tie, said pre-plating area situated along said horizontal conveyor in the vicinity of said pre-plating apparatus;

cross-tie manipulation means for appropriate positioning of said cross-tie within said pre-plating area, a plate conveyor having first and second ends, respectively, said first end of said plate: conveyor terminating near said pre-plating area;

plate dispensing means for dispensing an individual plate from said plate conveyor, for placement upon a cross-tie situated in said pre-plating area;

a spike feeder having first and second ends, said first end of said spike feeder terminating near said pre-plating area, said spike feeder further comprising spike feeding means at said first end of said spike feeder for feeding a spike generally near said pre-plating area;

spike driving means for driving said dispensed spike through a cross tie situated in said pre-plating area;

a spike manipulation arm for individually positioning a spike dispensed from said spike feeder above a spike aperture formed in said dispensed plate, so that said spike may be driven into the dispensed tie, fastening said plate to the tie.

2. The railroad cross-tie pre-plating system of claim 1, wherein-there is further included spike manipulation arm control means for operating said spike manipulation arm, said spike manipulation arm control means initiated by the operation of said spike driving means.

3. The, cross-tie pre-plating apparatus of claim 1, wherein there is further included spike dispensing means for dispensing individual spikes from said spike feeder automatically, said spike dispensing means comprising a pivotal spike loading member fitted to said spike feeders, said pivotal spike loading member having a front blocking member configured to interface with a first spike, selectively preventing the movement of or dispensing of said first spike, said pivotal spike loading members further comprising a rear blocking member configured to interface with a second, following spike when said first spike has been dispensed, said spike dispensing means initiated by a control piece having first and second ends, said first end connected to a pivotal spike loading member, said second end connected to said cross-tie manipulation means, such that motion in a first direction of said cross-tie manipulation means pivots said pivotal spike loading members such that said front blocking member interfaces with the first spike, and motion in a second direction of said cross-tie manipulation means pivots said pivotal spike loading members such that said front blocking member no longer interfaces with the first spike, dispensing said first spike, and the rear blocking member interfaces with the second, following spike.

4. A railroad cross-tie pre-plating system for fastening a rail plate to a cross-tie, comprising:

a generally horizontal conveyor having first and second ends, and a medial area generally therebetween;

a pre-plating apparatus juxtaposed said horizontal conveyor, said pre-plating apparatus further comprising:

a pre-plating area for manipulating and pre-plating a cross-tie, said pre-plating area situated along said horizontal conveyor in the vicinity of said pre-plating apparatus;

cross-tie manipulation means for appropriate positioning of said cross-tie within said pre-plating area, a plate conveyor having first and second ends, respectively, said plate conveyor further comprising plate storage means for storing a plurality of plates, said first end of said plate conveyor terminating near said pro-plating area;

plate dispensing means for dispensing an individual plate from said plate storage means, said plate dispensing means configured to dispense a plate upon a cross-tie situated in the vicinity of said pre-plating area;

a spike feeder having first and second ends, said first end of said spike feeder terminating near said pre-plating area, said spike feeder further comprising spike feeding means at said first end of said spike feeder for feeding a spike generally near said pro-plating area, said spike feeder further comprising spike storage means for storing a plurality of spikes;

spike driving means for driving said dispensed spike through a cross tie situated in said pre-plating area;

a spike manipulation arm for individually positioning a spike dispensed from said spike feeder and holding said dispensed spike above a spike aperture formed in said dispensed plate, so that said spike may be driven into the dispensed tie by said spike driving means, fastening said plate to the tie, said spike manipulation arm operated by spike manipulation arm control means for controlling said spike manipulation arm, said spike manipulation arm control means sequentially initiated by the operation of said spike driving means.

5. The cross-tie pre-plating apparatus of claim 4, wherein there is further included spike dispensing means for dispensing individual spikes from said spike feeder automatically, said spike dispensing means comprising a pivotal spike loading member fitted to said spike feeders, said pivotal spike loading member having a front blocking member configured to interface with a first spike, selectively preventing the movement of or dispensing of said first spike, said pivotal spike loading members further comprising a rear blocking member configured to interface with a second, following spike when said first spike has been dispensed, said spike dispensing means initiated by a control piece having first and second ends, said first end connected to a pivotal spike loading member, said second end connected to said cross-tie manipulation means, such that motion in a first direction of said cross-tie manipulation means pivots said pivotal spike loading members such that said front blocking member interfaces with the first spike, and motion in a second direction of said cross-tie manipulation means pivots said pivotal spike loading members such that said front blocking member no longer interfaces with the first spike, dispensing said first spike, and the rear blocking member interfaces with the second, following spike.

6. The cross-tie pre-plating apparatus of claim 4, wherein there is further included spike dispensing means for dispensing individual spikes from said spike feeder automatically, said spike dispensing means comprising a pivotal spike loading member fitted to said spike feeders, said pivotal spike loading member having a front blocking member configured to interface with a first spike, selectively preventing the movement of or dispensing of said first spike, said pivotal spike loading members further comprising a rear blocking member configured to interface with a second, following spike when said first spike has been dispensed, said spike dispensing means initiated by a control piece having first and second ends, said first end connected to a pivotal spike loading member, said second end interfacing with another element of said pro-plating apparatus, such that motion in a first direction pivots said pivotal spike loading members such that said front blocking member interfaces with the first spike, and motion in a second direction pivots said pivotal spike loading members such that said front blocking member no longer interfaces with the first spike, dispensing said first spike, and the rear blocking member interfaces with the second, following spike.

* * * * *